US012594202B2

(12) United States Patent
Morgan et al.

(10) Patent No.: US 12,594,202 B2
(45) Date of Patent: Apr. 7, 2026

(54) SEAT LIFT WITH NON-LINEAR SPRING ASSIST

(71) Applicant: Direct Supply, Inc., Milwaukee, WI (US)

(72) Inventors: Justin T. Morgan, Cedarburg, WI (US); Anthony J. Patrick, Delafield, WI (US); Shawn A. Ostendorf, Milwaukee, WI (US)

(73) Assignee: Direct Supply, Inc., Milwaukee, WI (US)

( * ) Notice: Subject to any disclaimer, the term of this patent is extended or adjusted under 35 U.S.C. 154(b) by 828 days.

(21) Appl. No.: 17/888,192

(22) Filed: Aug. 15, 2022

(65) Prior Publication Data

US 2023/0058230 A1 Feb. 23, 2023

Related U.S. Application Data

(60) Provisional application No. 63/232,876, filed on Aug. 13, 2021.

(51) Int. Cl.
*A61G 5/10* (2006.01)

(52) U.S. Cl.
CPC .................................. *A61G 5/1059* (2013.01)

(58) Field of Classification Search
CPC ............................ A61G 5/1059; A61G 5/1056
See application file for complete search history.

(56) References Cited

U.S. PATENT DOCUMENTS 974,769 A 11/1910 Hoff
2,539,034 A 1/1951 Ruby
3,023,048 A 2/1962 Barton
3,091,426 A 5/1963 Bogart
3,250,569 A 5/1966 Gaffney
3,659,897 A 5/1972 Wright
3,851,917 A 12/1974 Horstmann et al.
4,076,304 A 2/1978 Deucher
4,519,649 A 5/1985 Tanaka et al.
4,569,556 A 2/1986 Pillot
4,629,162 A 12/1986 Porche
(Continued)

OTHER PUBLICATIONS

"Carex Upeasy Seat Assist", https://www.walmart.com/ip/Carex-Upeasy-Seat-Assist-Lifting-Seat-Standard-Size/25490686?wmlspartner=wlpa&selectedSellerId=0&adid=22222222227018395959&wl0=&wl1=g&wl2=c&wl3=40754489192&wl4=pla-78607083752&wl5=9018848&wl6=&wl7=&wl8=&wl9=pla&wl10=8175035&wl11=online&wl12=25490686&wl13=&veh=sem.
(Continued)

*Primary Examiner* — Valentin Neacsu
*Assistant Examiner* — Marlon A Arce
(74) *Attorney, Agent, or Firm* — Boyle Fredrickson SC

(57) ABSTRACT

The present invention provides an assembly having a wheelchair and a lift assembly to urge the seat surface upward with respect to the frame from a lowered position when supporting a seated individual during use to an elevated position with respect to the frame as to assist the individual during ingress or egress to or from the wheelchair. The lift assembly may include a mechanical linkage and an actuator assembly. The actuator assembly produced a nonlinear lift force having a first period exhibiting a first rate of amplitude increase when the seating surface is nearer the lowered position and a second period exhibiting a second rate of amplitude change that is less than the first rate of amplitude increase when the seating surface is nearer the elevated position.

22 Claims, 12 Drawing Sheets

(56) References Cited

U.S. PATENT DOCUMENTS

| | | | | |
|---|---|---|---|---|
| 4,632,455 | A | 12/1986 | Schiller et al. | |
| 4,688,851 | A | 8/1987 | Whiteford | |
| 4,690,457 | A | 9/1987 | Poncy et al. | |
| 4,838,612 | A | 6/1989 | Cross | |
| 4,852,849 | A | 8/1989 | Jones | |
| 4,929,022 | A | 5/1990 | Geraci | |
| 4,979,726 | A | 12/1990 | Geraci | |
| 5,011,224 | A | 4/1991 | Paul | |
| 5,055,518 | A | 10/1991 | Dupont et al. | |
| 5,082,327 | A | 1/1992 | Crisp | |
| 5,116,100 | A | 5/1992 | Iversen | |
| 5,165,753 | A | 11/1992 | Henderson | |
| 5,224,750 | A | 7/1993 | Clark et al. | |
| 5,294,179 | A | 3/1994 | Rudes et al. | |
| 5,316,370 | A | 5/1994 | Newman | |
| 5,333,931 | A | 8/1994 | Weddendorf | |
| 5,346,280 | A * | 9/1994 | Deumite | A61G 5/14 297/DIG. 10 |
| 5,375,910 | A | 12/1994 | Murphy | |
| 5,383,709 | A | 1/1995 | Chaney et al. | |
| 5,498,064 | A | 3/1996 | Hooker et al. | |
| 5,505,518 | A | 4/1996 | Pike | |
| 5,513,867 | A | 5/1996 | Bloswick et al. | |
| 5,520,403 | A | 5/1996 | Bergstrom et al. | |
| 5,556,121 | A | 9/1996 | Pillot | |
| 5,641,201 | A | 6/1997 | Casey et al. | |
| 5,803,545 | A | 9/1998 | Guguin | |
| 5,898,953 | A | 5/1999 | Paxon | |
| 5,918,936 | A | 7/1999 | Murphy | |
| 5,931,532 | A | 8/1999 | Kemmerer et al. | |
| 6,035,462 | A | 3/2000 | Bennett et al. | |
| 6,113,188 | A | 9/2000 | Stewart et al. | |
| 6,213,554 | B1 | 4/2001 | Marcoux et al. | |
| 6,425,634 | B1 | 7/2002 | Romero | |
| 6,449,783 | B1 | 9/2002 | Moser | |
| 6,454,285 | B1 | 9/2002 | Koenig | |
| 6,540,250 | B1 * | 4/2003 | Peterson | A61G 5/125 297/DIG. 10 |
| 6,598,246 | B1 | 7/2003 | Shou | |
| 6,637,818 | B2 | 10/2003 | Williams | |
| 6,688,437 | B2 | 2/2004 | Usherovich | |
| 6,702,383 | B2 | 3/2004 | Newman et al. | |
| 6,793,232 | B1 | 9/2004 | Wing | |
| 6,851,751 | B1 | 2/2005 | Romero et al. | |
| 6,945,604 | B2 | 9/2005 | Splane, Jr. | |
| 7,021,713 | B2 | 4/2006 | Kao et al. | |
| 7,055,840 | B1 | 6/2006 | Kelso | |
| 7,097,189 | B2 | 8/2006 | Hsu | |
| 7,165,778 | B2 | 1/2007 | Kuiken | |
| 7,455,360 | B2 | 11/2008 | White et al. | |
| 7,575,279 | B2 | 8/2009 | Robertson | |
| 7,594,698 | B1 | 9/2009 | Palmer | |
| 7,669,863 | B2 | 3/2010 | Steiner et al. | |
| 8,113,587 | B1 * | 2/2012 | Zarinfar | A61G 5/0841 297/440.22 |
| 8,201,890 | B1 | 6/2012 | Nagoaka Mihara | |
| 8,360,518 | B2 | 1/2013 | Braaten | |
| 8,438,675 | B2 | 5/2013 | Henshaw et al. | |
| 8,590,920 | B2 * | 11/2013 | Masaki | A61G 5/0825 297/337 |
| 8,740,304 | B2 | 6/2014 | Yu | |
| 8,876,138 | B2 * | 11/2014 | Wilde | A61G 5/14 297/313 |
| 8,888,181 | B2 | 11/2014 | Perraut et al. | |
| 8,973,997 | B2 | 3/2015 | Green et al. | |
| 9,066,841 | B2 | 6/2015 | Mastropole | |
| 9,114,731 | B2 | 8/2015 | Horiguchi et al. | |
| 9,301,896 | B2 * | 4/2016 | Hsieh | A61G 5/14 |
| 9,492,339 | B2 | 11/2016 | Leib | |
| 9,693,914 | B2 | 7/2017 | Ooyama | |
| 9,848,704 | B1 | 12/2017 | Pollard et al. | |
| 9,849,050 | B2 | 12/2017 | McClean | |
| 9,861,542 | B2 | 1/2018 | Christian | |
| 9,907,723 | B2 | 3/2018 | Bisceglia et al. | |
| 9,913,769 | B2 | 3/2018 | Bliem | |
| 9,918,886 | B2 | 3/2018 | Splane, Jr. et al. | |
| 10,118,704 | B2 | 11/2018 | Velasco | |
| 10,449,100 | B2 | 10/2019 | Hector | |
| 10,881,564 | B2 | 1/2021 | Splane et al. | |
| 2004/0026977 | A1 | 2/2004 | Vaughan | |
| 2005/0000755 | A1 | 1/2005 | Ikegami et al. | |
| 2005/0046255 | A1 | 3/2005 | Bressler et al. | |
| 2005/0200180 | A1 | 9/2005 | Guyton et al. | |
| 2008/0133089 | A1 | 6/2008 | Bayomy et al. | |
| 2008/0296947 | A1 | 12/2008 | Galumbeck | |
| 2010/0219668 | A1 | 9/2010 | Nelson et al. | |
| 2011/0084529 | A1 | 4/2011 | Huang | |
| 2011/0121625 | A1 | 5/2011 | Lipford | |
| 2012/0241265 | A1 | 9/2012 | Ooyama | |
| 2013/0069407 | A1 | 3/2013 | Park et al. | |
| 2013/0169017 | A1 | 7/2013 | Masunaga et al. | |
| 2013/0175840 | A1 | 7/2013 | Nadav | |
| 2014/0203606 | A1 | 7/2014 | Line et al. | |
| 2016/0220432 | A1 * | 8/2016 | Ooyama | A61G 5/101 |
| 2017/0296410 | A1 | 10/2017 | Feldman et al. | |
| 2018/0078433 | A1 | 3/2018 | Suess | |
| 2018/0085266 | A1 | 3/2018 | Huang | |
| 2020/0019724 | A1 | 1/2020 | Jager et al. | |
| 2020/0150607 | A1 | 5/2020 | Matlin | |
| 2020/0155391 | A1 * | 5/2020 | Morgan | A61G 5/1035 |
| 2020/0237592 | A1 | 7/2020 | Chu | |
| 2021/0030608 | A1 | 2/2021 | Brown et al. | |

OTHER PUBLICATIONS

"Carex Premium Lifting Seat Assist With Memory Foam", o https://www.walmart.com/ip/Uplift-Premium-Portable-Power-Seat-20/21453290?wmlspartner=wlpa&selectedSellerld=0&adid=22222222227015460894&wl0=&wl1=g&wl2=c&wl3=40753569512&wl4=pla-78604384832&wl5=9018848&wl6=&wl7=&wl8=&wl9=pla&wl10=8175035&wl11=online&wl12=21453290&wl13=&veh=sem#about-item.

"Karman Lightweight Power Standing Wheelchair Seat", o https://www.walmart.com/ip/Karman-Lightweight-Power-Standing-Wheelchair-Seat-Arctic-Silver-18-Inch/265947119?wmlspartner=wlpa&selectedSellerld=9044&adid=22222222227094431574&wmlspartner=wmtlabs&wl0=&wl1=g&w12=c&wl3=215316105990&wl4=pla-347261953369&wl5=9018848&wl6=&wl7=&wl8=&wl9=pla&wl10=115785754&wl11=online&wl12=265947119&wl13=&veh=sem.

"Mobile Commode Chair With Assistant Seat", o https://www.walmart.com/ip/Mobile-Commode-Chair-with-Assistive-Seat-Helps-User-to-Sit-Down-Get-Up/766412863?wmlspartner=wlpa&selectedSellerld=0&adid=22222222227093357178&wmlspartner=wmtlabs&wl0=&wl1=g&wl2=c&wl3=212773995525&wl4=pla-344342590925&wl5=9018848&wl6=&wl7=&wl8=&wl9=pla&wl10=8175035&wl11=online&w112=766412863&wl13=&veh=sem.

* cited by examiner

300

308

SEAT LIFT WITH NON-LINEAR SPRING ASSIST

CROSS REFERENCE TO RELATED APPLICATION

This application claims priority to U.S. Provisional Patent Application Ser. No. 63/232,876 filed on Aug. 13, 2021, the entirety of which is incorporated herein by reference.

BACKGROUND OF THE INVENTION

The present invention relates to a lift mechanism for use with a wheelchair; and more specifically, relates to a seat lift mechanism to aid in the ingress and egress of a physically impaired individual from a wheelchair.

Some individuals who require the use of a wheelchair may experience difficulty entering the wheelchair, i.e., ingressing, and/or rising from the wheelchair, i.e., egressing, the wheelchair arising from decreased physical strength or a temporary injury or ailment.

Prior attempts to assist such users in using the wheelchair include the use of electrically driven motors or hydraulic systems to actuate lift mechanisms in the seat. These prior solutions may be heavy, cumbersome, and expensive and cannot operate in the absence of a power supply, such as an on-board battery.

SUMMARY OF THE INVENTION

The present invention eliminates the need for a separate power source for a seat lift by storing energy in the spring as the user sits and releasing that energy to assist the user in standing during egress. Importantly, the present invention tailors the lifting force to rapidly decrease as the user stands to prevent the user from being unbalanced by the spring force as they reach standing position while still providing sufficient force to reach that standing position. This nonlinear force profile may be obtained in one embodiment by antagonistic springs that engage each other for a portion of the seat movement cycle providing a high degree of control of lifting force as a function of seat lift height.

In one embodiment, the present invention provides an assembly having a wheelchair and a wheelchair lift. The wheelchair includes a frame having a seat surface configured for supporting a seated individual, a first and second wheel attached to the frame at the left and right sides of the seat surface that support the frame and can be rotated by the seated individual. The lift assembly is positioned between the seat surface and the frame to urge the seat surface upward with respect to the frame from a lowered position when supporting the seated individual during use to an elevated position with respect to the frame assisting the individual during ingress or egress to or from the wheelchair. The lift assembly comprises a first portion mounted to the frame, a second portion mounted to the seating surface and a mechanical lift linkage extending from the first portion to the second portion. An actuator extending from the first portion to the second portion facilitates raising the second portion. The actuator produces a nonlinear lift force having a first period exhibiting a first rate of amplitude increase when the seating surface is nearer the lowered position and a second period exhibiting a second rate of amplitude change that is less than the first rate of amplitude increase when the seating surface is nearer the elevated position.

The lift assembly may be provided as a retrofit to an existing wheelchair.

It is thus a feature of at least one embodiment of the invention to provide a lift kit configured to be affixed to a collapsible wheelchair.

The lift assembly may reduce the rate of lift force exerted at the top of the seat travel to prohibit excessive force being exerted upon the individual as they rise from the wheelchair.

It is thus a feature of at least one embodiment of the invention to provide an actuator assembly that comprises a seat lift actuator providing a lifting force and an antagonistic actuator providing an opposing attenuation force.

The lift assembly may provide variable seat lifting forces to accommodate the needs of various individual users.

It is thus a feature of at least one embodiment of the invention to provide a variable angle of the seat lift actuator relative to the first portion of the lift mechanism.

The lift assembly may be customized to provide a user desired nonlinear lift force.

It is thus a feature of at least one embodiment of the invention to provide the antagonistic actuator extending from a first end configured to engage the first portion of the lift assembly and an opposing second end configured to releasably engage the mechanical linkage when the second portion of the lift assembly is nearer the elevated position.

The lift assembly may increase or decrease the magnitude of the attenuating force supplied near the top of seat travel.

It is thus a feature of at least one embodiment of the invention to provide a variable angle of the antagonistic actuator relative to the first portion of the lift mechanism.

The lift assembly may provide a mechanism for readily modifying the nonlinear lifting force applied to the seat.

It is thus a feature of at least one embodiment of the invention to provide a variable length of the antagonistic actuator extending between the first end configured to engage the first portion of the lift assembly and an opposing second end configured to releasably engage the mechanical linkage The lift assembly may modify to position along the path of seat travel at which the attenuating force is supplied.

It is thus a feature of at least one embodiment of the invention to provide a variable position along extension of the mechanical linkage in which the antagonistic actuator applies the opposing attenuation force and the nonlinear lift force transitions from the first period to the second period.

These and other features and aspects of the present invention will be better appreciated and understood when considered in conjunction with the following description and the accompanying drawings. It should be understood, however, that the following description, while indicating representative embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of the present invention, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION

Figure 1:
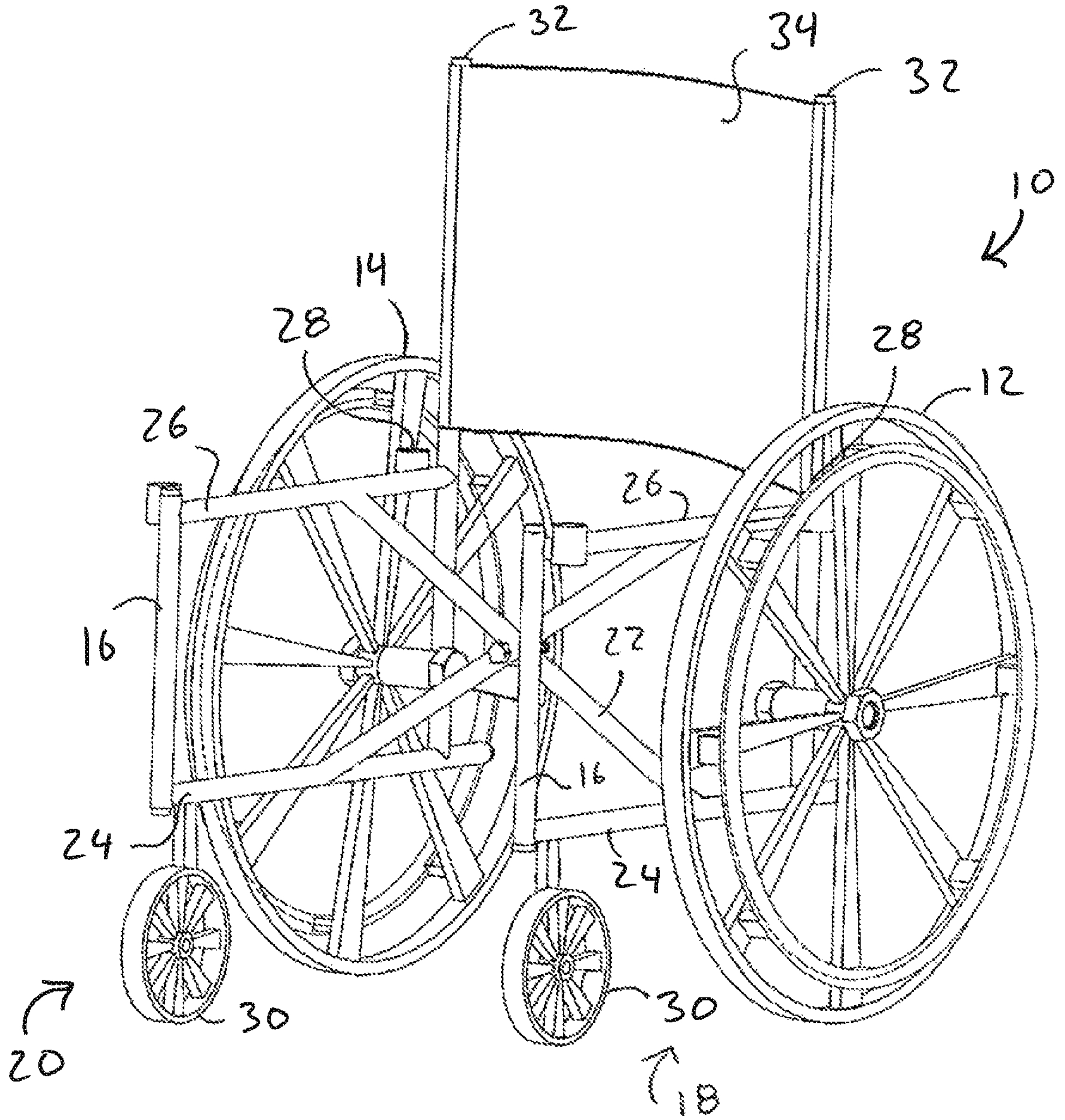
FIG. 1 is front side perspective view of a collapsible wheelchair configured for use with a seat lift assist device according to one embodiment of the present invention.

Referring initially to FIG. 1, the general features of fixed or collapsible wheelchair 10 are shown in accordance with one embodiment of the present invention, including a first wheel 12 and a second wheel 14 located on opposing sides of a frame 16. The frame 16 includes first side frame subassembly 18 adjacent the first wheel 12 and a second side frame subassembly 20 adjacent the second wheel 14. A cross frame 22 configured in the shape of an "X" extends between the first side frame subassembly 18 and the second side frame subassembly 20, wherein the cross frame 22 may include hinging members or pivots to collapse the wheelchair 10 such that the wheels 12, 14 are separated by a distance less than a width of the seating surface of the wheelchair 10. Each of the first and second frame subassemblies 18, 20 further includes an anti-tilt or first horizontal tube 24, affixed to a portion of the cross frame 22 at or near the bottom of the wheelchair frame 16, and a second horizontal tube 26, affixed to a second portion of the cross frame 22, above the first horizontal tube 24. In some embodiments, each subassembly 18, 20 of the wheelchair frame 16 may also include a third horizontal tube 28 (not shown in FIG. 1), positioned adjacent to or slightly above the second horizontal tube 26, which may traditionally function as a seat retention device. The wheels 12, 14, are generally affixed to the relative subassembly 18, 20, at or near the rear end of the first horizontal tube 24, while a castor wheel 30 may extend from an opposing front end of the first horizontal tube 24.

To brake the wheelchair 10, a standard lever actuated wheel lock (not shown in FIG. 1) may be mounted at or near the second horizontal tube 26, where downward motion on the handle forces a locking bar into frictional engagement with the outer surface of the corresponding wheel 12, 14. A vertical tube 32 generally extends perpendicular to the first 24, second 26 and third horizontal tubes, from the rear end of the first horizontal tube 24 to a distance above the third horizontal tube. The vertical tube 32 may terminate in a push handle and define an attachment location along its length for the seat back 34, generally at a height above the third horizontal tube. As shown in FIG. 1, a removable armrest may be configured to extend above the second 26 or third horizontal tube, through engagement with one or more sockets 28 positioned along the second horizontal tube 26.

In accordance with the wheelchair 10 shown in FIG. 1, the armrests are often grasped by the user when ingressing and/or egressing the wheelchair 10. However, as was described above, some users may require additional assistance when transitioning from sitting or rising from the wheelchair 10. Accordingly, one embodiments of the present invention is described in further detail below with reference to the general features of a collapsible wheelchair 10, as was described above.

Figure 2:
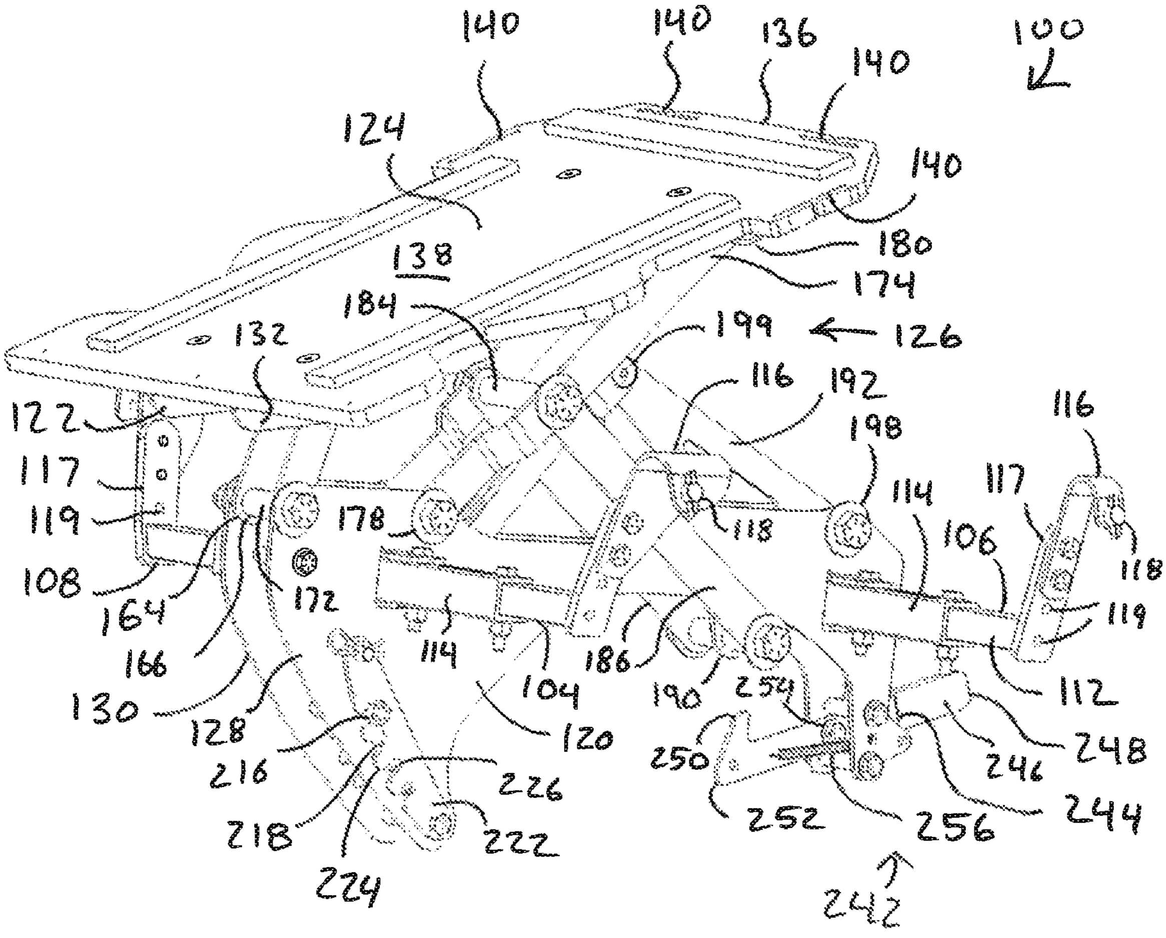
FIG. 2 is a front side perspective view of the seat lift assist device according to one embodiment of the present invention.
Figure 7:
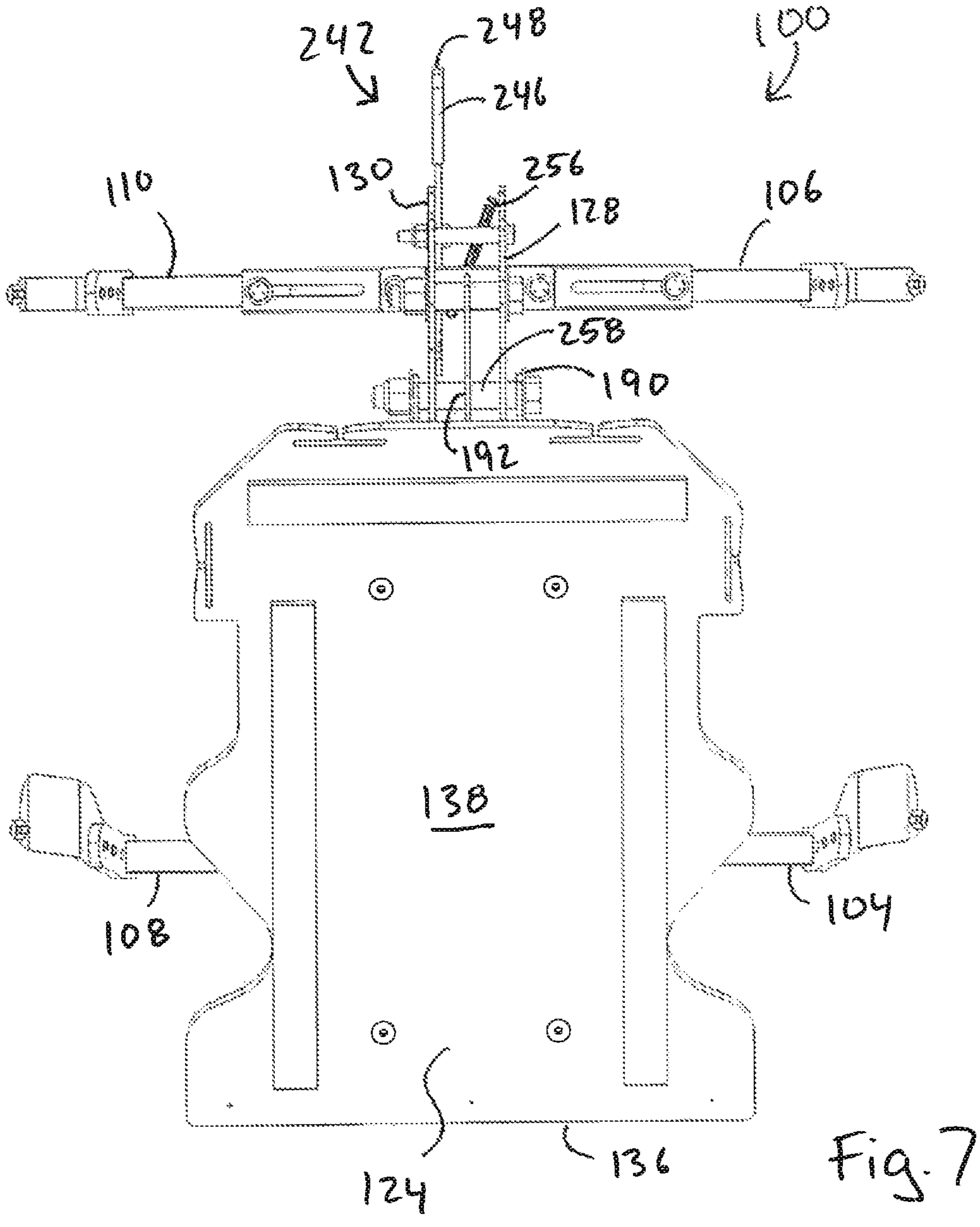
FIG. 7 is a top plan view of the lift assist device of FIG. 2.
Figure 8:
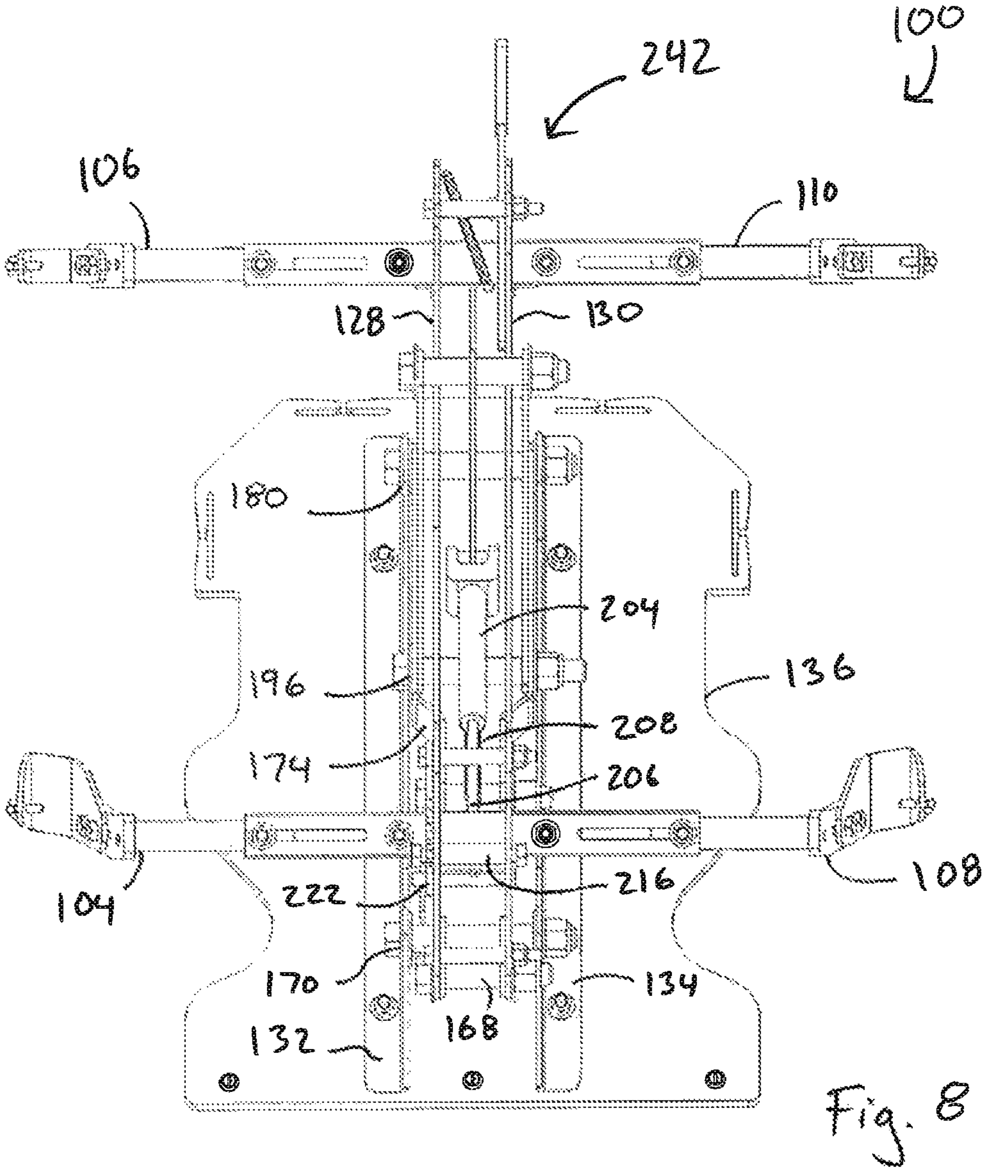
FIG. 8 is a bottom plan view of the lift assist device of FIG. 2.

Turning now generally to FIGS. 2-10, and initially FIG. 2, in one embodiment, the present invention provides a wheelchair 10, such as that which was shown in FIG. 1, includes a lift assist device 100. Device 100 includes a lift assembly 102 that is generally configured to be positioned between the frame 16 of the wheelchair 10 and the seat surface. More specifically, the lift assembly 102 is positioned between the upper most horizontal bar, which may be either the second horizontal bar 26 or third horizontal bar of the wheelchair 10 depending upon the wheelchair design and the seating surface. More specifically, the lift assembly 102 includes a first side forward mount 104 and a first side rear mount 106 that are configured to be releasably secured to the second horizontal bar 26 or third horizontal bar of the first side frame subassembly 18 adjacent the first wheel 12. A corresponding and opposing second side forward mount 108 and a second side rear mount 110 (not shown in FIG. 2) are configured to be releasably secured to the second horizontal bar 26 or third horizontal bar of the second side frame subassembly 20 adjacent the second wheel 14. Each of the mounts 104, 106, 108, 110 comprises an arm 112 that is telescopically received within a socket 114, as seen in FIGS. 7 and 8, which can be extended or retracted to a desired length in order to accommodate installation of the device 100 in wheelchairs 10 of various widths. A fastener, such as threaded bolt and nut may secure the arm 112 within the socket 114 at a desired position during installation. In one embodiment of the present invention, each arm 112 may be adjustable over a distance of approximately 1.0 to 4.0 inches, such that the device 100 is configured for installation in wheelchairs having a width of between 16.0 and 22.0 inches. However, it should be understood that the device 100 may be well suited for use in wheelchairs of alternative widths as well. Still referring to FIGS. 2-10, the end of each arm 112 may further comprise a hook 116 or clamp that is configured to rest upon and engage the top surface of either the second horizontal bar 26 or third horizontal bar. A threaded fastener 118 or locking pin may extend through the hook 116 and engage the underside of the second horizontal bar 26 or third horizontal bar, once installed to prevent device 100 from being lifted off of the wheelchair frame 16. The hook 116 may be affixed to mounting plate 117 disposed at a distal end of the corresponding arm 112, where a plurality of mounting apertures 119 disposed within the mounting plate 117 allow for the relative height of the hook 116 to be vertically adjusted to accommodate wheelchairs 10 heights and/or to allow for adjustability of the height of the seating pan relative to the wheelchair frame 16.

Still referring to FIGS. 2-10, and specifically FIG. 2 the lift assembly 102 will now be described in further detail and may include a stationary first or bottom portion 120 that is configured to be affixed indirectly to the frame 16 of the wheelchair 10 via the of the mounts 104, 106, 108, 110, a relatively movable second or upper portion 122 that is mounted to or may alternatively form the seat surface 124 of the wheelchair 10, and a mechanical lift linkage 126 extending from the first portion 120 to the second portion 122.

The bottom portion 120 may be formed of spaced apart first and second plates 128, 130 that extend longitudinally parallel between first side frame subassembly 18 and the second side frame subassembly 20 of the wheelchair 10 in a generally vertical plane. The first and second plates 128, 130 provide a mounting location for a bottom portion of the mechanical lift linkage 126, as will be described below. The afore mentioned sockets 114 of each mount 104, 106, 108, 110 may also extend laterally outwardly from or alternatively extend laterally through the first and second plates 128, 130 of the bottom portion 120 as shown in FIG. 2.

Similarly, the upper portion 122 of the lift assembly 102 may be formed of spaced apart first and second rails 132, 134 that also extend longitudinally parallel between first side frame subassembly 18 and the second side frame subassembly 20 of the wheelchair 10, generally coplanar or parallel with the first and second plates 128, 130 of the bottom portion 120. The rails 132, 134 may be affixed to the underside of a seating pan 136, the upper side of which defines the seat surface 124, or alternatively formed integrally therewith and provide a mounting location for an upper portion of the mechanical lift linkage 126, as will be described below.

The seating pan 136 is configured to rise into an elevated position, as shown in FIGS. 2-10 with respect to the bottom portion 120 of the device 100 and frame 16 of the wheelchair 10, as to assist an individual during ingress or egress to or from the wheelchair 10. The seating pan 136 is configured to extend between first side frame subassembly 18 and the second side frame subassembly 20 of the wheelchair 10 in a generally horizontal direction when receiving a seated individual thereon, such that it has a width approximately equal to that of the seat surface 124. In one embodiment of the present invention, the top surface 138 of the seating pan 130 may define the seating surface 124 and/or may be configured to receive a seating cushion thereon. The seating cushion may be retained on the top surface 138 of the seating pan 136 by one or more straps or fasteners extending through mounting apertures 140 disposed therein.

Figure 3:
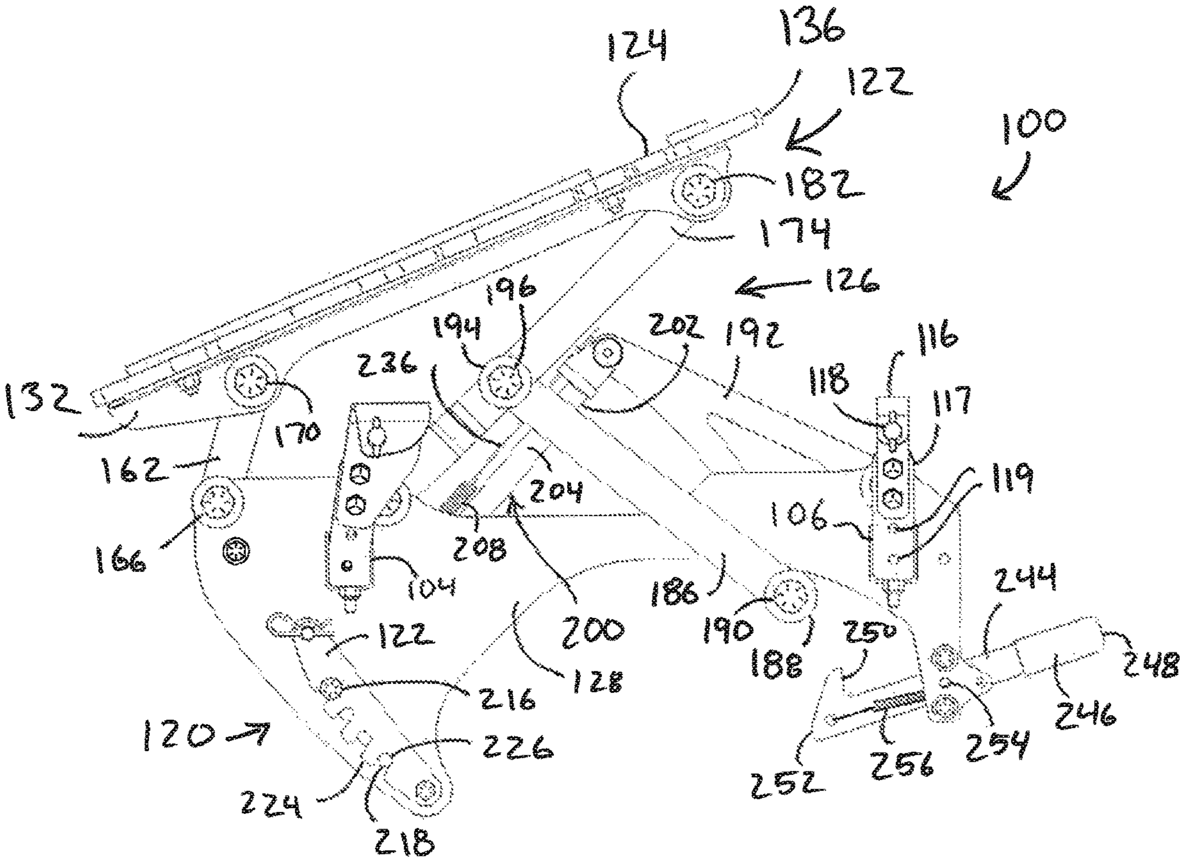
FIG. 3 is a left end view of the lift assist device of FIG. 2.
Figure 4:
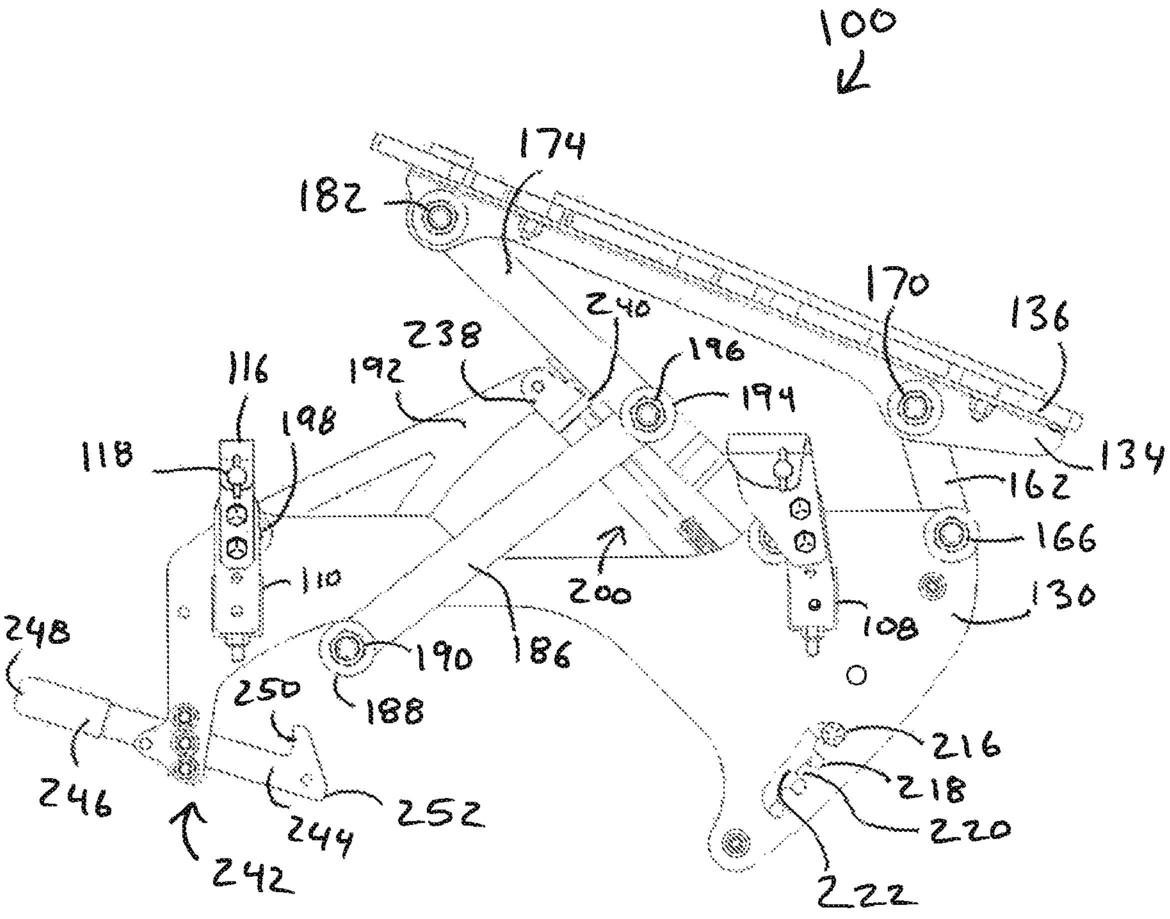
FIG. 4 is a right end view of the lift assist device of FIG. 2.
Figure 5:
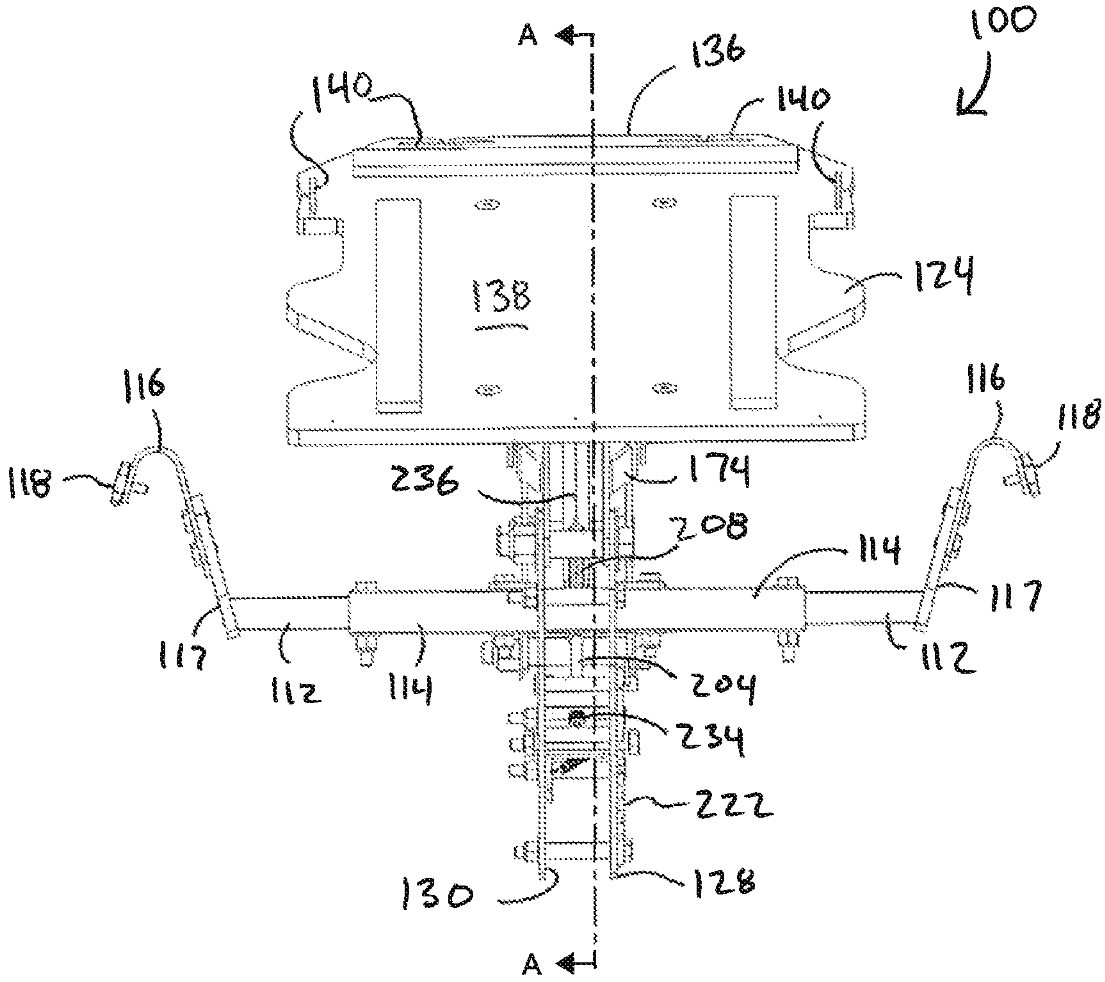
FIG. 5 is a front view of the lift assist device of FIG. 2, showing line A-A.
Figure 6:
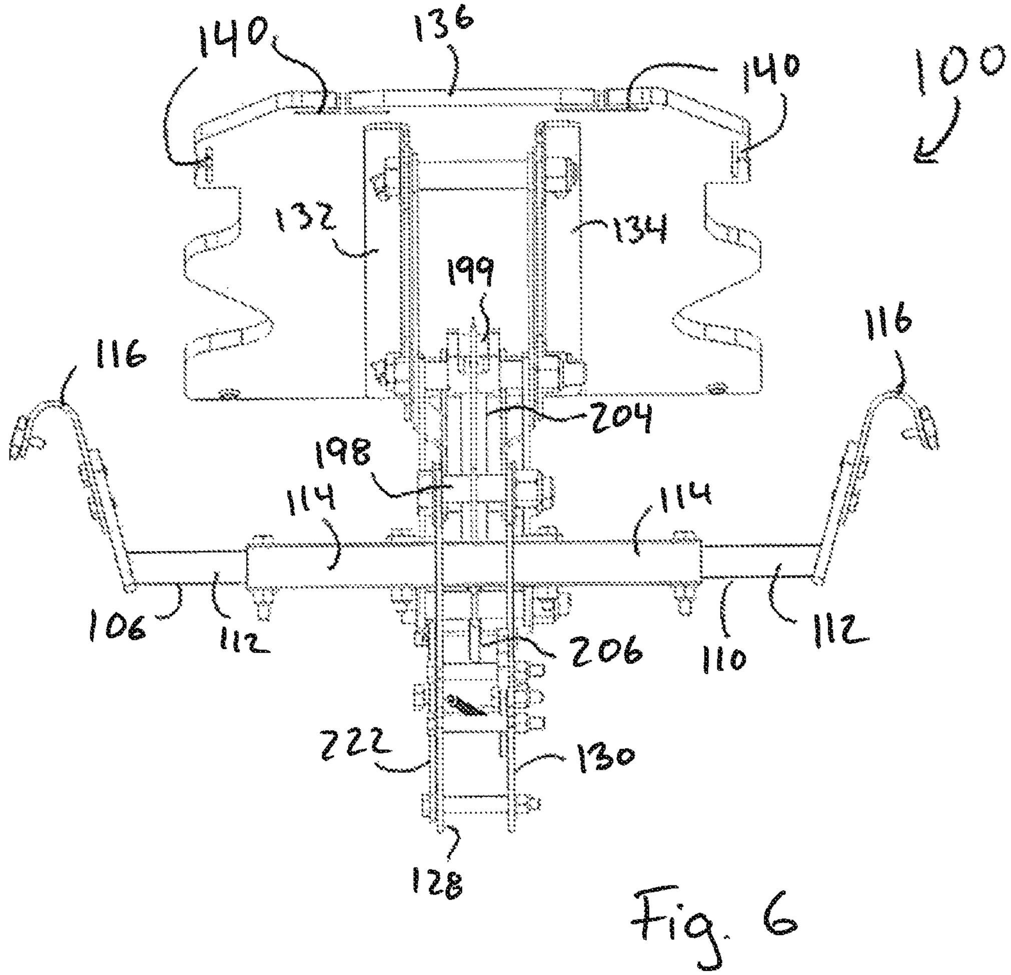
FIG. 6 is a rear view of the lift assist device of FIG. 2.

Turning now the mechanical lift linkage 126, as shown in FIG. 2-4, which pivotably extends between the first or bottom portion 120 and the second or upper portion 122 of the lift assembly 102 will be described. The linkage 126 includes a first linkage arm 162 disposed near the front of the seating pan 136 that is rotatably affixed at its first end 164 to a first arm mounting location 166 disposed at or near a front end of plates 128, 130 of the first portion 120. The first arm 162 extends upwardly to its opposing second end 168 (not shown in FIG. 2), which is similarly rotatably affixed to a first arm mounting location 170 disposed at or near a front end of the rails 132, 134 of the second portion 122, respectively. As shown in FIGS. 3-4, the first arm mounting location 170 of the second portion 122 is located rearwardly of the first arm mounting location 166 of the first portion 120. More specifically, the first arm mounting location 170 of the second portion 122 is set back a distance of approximately 1.0 cm to 10 cm relative to the first arm mounting location 166 of the first portion 120, and more preferably 5 cm. Accordingly, when the second portion 122 is in an elevated position, as shown in FIGS. 2-10, and the first arm 162 is generally perpendicular to the first portion 122, the raised front edge of the seating pan 136 will extend forward of the front edge of the first portion 122. Furthermore, as shown in FIGS. 2-4, the first arm 162 may be formed of two spaced apart first arms 162, separated by a spacer 172, or alternatively may be formed of a single arm 162.

As shown in FIG. 3, the linkage 126 further includes a second arm 174 disposed rearwardly of the first arm 162 that is rotatably affixed at its first end 176 to a second arm mounting location 178 disposed about the top of the plates 128, 130 of the first portion 120, and rearwardly of the first arm mounting location 166. The second arm 174 extends upwardly to its opposing second end 180, which is similarly rotatably affixed to a second arm mounting location 182 disposed at or near a rear end of the rails 132, 134 of the second portion 122, respectively. As shown in FIGS. 3-4, the second arm mounting location 170 of the second portion 122 is located rearwardly of the first arm mounting location 166 of the first portion 120. Furthermore, the second arm 174 had a length that is preferably longer than the length of the first arm 162 so as to tip the seat surface 40, e.g., second portion 122 or seating pan 136, forward as the seat rises. By way of non-limiting example, the first arm 162 may have a length of approximately 2 cm to 20 cm, and preferably 10 cm, while the second arm 174 may have a length of approximately 15 cm to 35 cm, and preferably 25 cm. In this illustrated example, the first portion 120 may have a length of approximately 34 cm to 50 cm, and preferably 40 cm, while the second portion 122 may have a length of approximately 34 cm to 50 cm, and preferably 40 cm. In one embodiment, the arms 162, 174 are linear, however, they need not be. For example, one or both or the arms 162, 174 may include a bend or angle along its length, which alters the position of the corresponding second end 168, 180 of the arm 162, 174 during travel. Furthermore, as shown in FIGS. 2-4, as with the first arm 162, so too may the second arm 174 be formed of two spaced apart second arms 174, separated by a spacer 184, or alternatively may be formed of a single arm 174.

Figure 10:
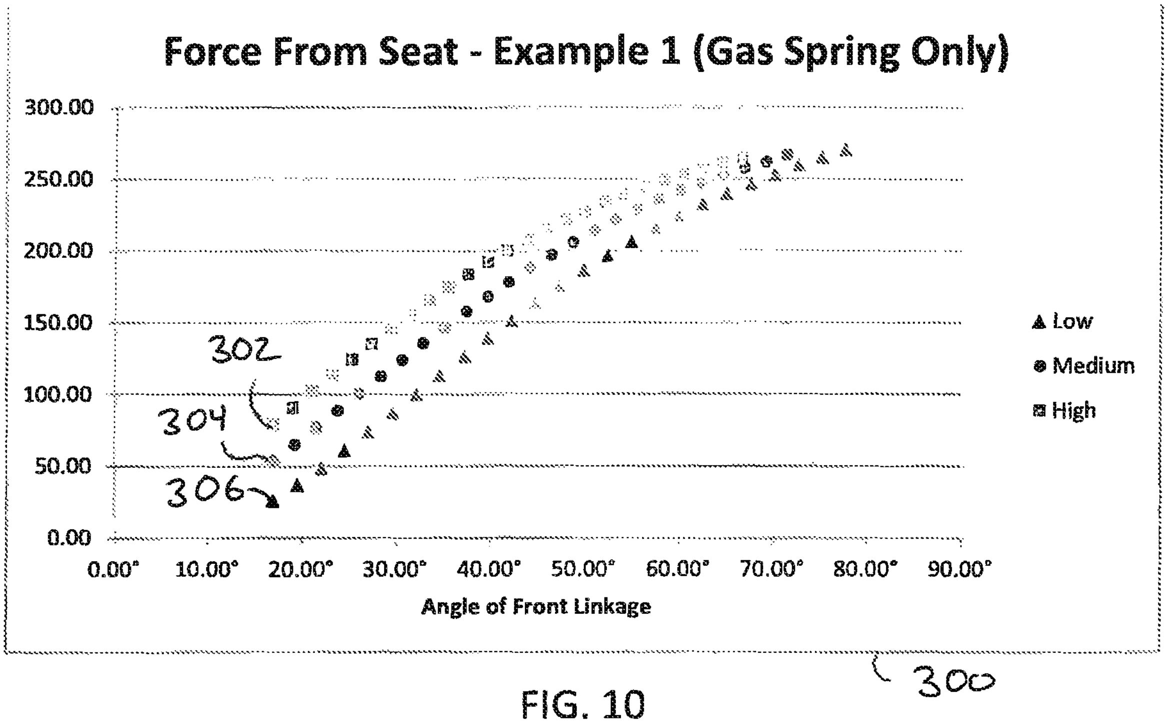
FIG. 10 is a chart illustrating the force in pounds from the seating surface of the lift assist device over the course of seating pan travel, as applied by only a gas spring, when an end of the gas spring is positioned in three different locations.

In order to initiate movement of the seating pan 136, the mechanical lift assembly 126 further comprises a drive arm that is rotatably affixed at its first end 188 to a drive arm mounting location 190 disposed on a cam plate 192. As shown in FIG. 3, the drive arm 186 extends upwardly to its opposing second end 194, which is similarly rotatably affixed at a mounting location 196 along the length of the second arm 174, between its first and second ends 176, 180. As shown in FIG. 2, in one embodiment, the second end 194 of the drive arm 186 may be affixed at a mounting location 196 that also comprised the spacer 184 separating the two spaced apart second arms 174. In this configuration, the first end 188 of the drive arm acts as a follower, engaging the cam plate 192, which when the cam plate 192 is rotated translates into a linear driving force exerted by the drive arm 186 on the second arm 174 of the mechanical lift assembly. As shown in FIG. 10, the configuration of the actuator assembly 200 including the mechanical linkage and its cam plate 192 may result in a degree of non-linear force, i.e., a plateau, that reduces the rate of increase in force, in the absence of a delayed counteracting coil spring 208 as described below.

As indicated above, linear movement of the drive arm 186 is initiated by a rotational movement of the cam plate 192. The cam plate 192 is pivotably affixed to a mounting location 198 that is at a generally rearward portion of the plates 128, 130 of the first portion 120 of the lift assembly 126. A lift actuator assembly 200, which may include both a gas spring 202 having a cylinder 204 and a movable piston rod 206 extending therefrom and an antagonistic tension spring 208 having a parallel axial extent, is also rotationally affixed to the cam plate 192 at forward mounting location 199. In use, activation of the lift actuator assembly 200 exerts a rotational force on the cam plate 192, which pivots about the mounting location 198. In doing so, the first end 188 of the drive arm 186, which is mounted to the cam plate 192 at the mounting location 190, is driven forward, thereby exerting a forward linear driving force through the drive arm 186 and into the second arm 174 resulting in the rising of the seating pan 136.

More specifically, the gas spring 202 provides opposed ends 210 and 212 which are biased to move in separation by a "lifting force" discussed in further detail below. Although it should be understood that the present invention may include other forms of lift assemblies 200 or actuators. An end 210 of the gas spring 202, which may be either an end of the cylinder 204 or the movable piston rod 206, is affixed to movable mounting block 214. The block 214 is movably mounted relative to the first portion 120 of the lift mechanism 102. As shown in FIG. 2, a bolt 216 extends laterally through the mounting block 214 and rests within a slot 218 formed by spaced apart teeth 220 within the first and second plate 128, 130 of the first portion 120 of the lift mechanism 102. As shown in FIG. 2, the lift mechanism 102 includes four (4) slots 218 for receiving the bolt 216 of the mounting block 214. By selectively positioning the bolt 216 within the various mounting slots 218, the angle of the gas spring 202 exerting a lifting force upon the cam plate 192 and/or length of the movable piston rod 206 travel is altered to provide a variable lifting force acting upon the seating pan 136. To further secure the mounting block 214 and its bolt 216 in the desired slot 218 the first portion 120 of the lift assembly 102 may also include a locking gate or comb 222, having a series of spaced apart teeth 224 and intermittent slots 226, that are oriented opposite those of the first and second plates 128, 139. As shown in FIG. 2, once the bolt 216 is set in its desired slot 218, the one or more combs 222 may be secured by threaded fastener and/or locking pin, to prevent removal. As shown in FIG. 2, the lift mechanism 102 includes four (4) slots 218, 226 to accommodate four (4) variable lifting forces exerted by the gas spring 202. However, it should be understood that any number of one (1) or more slots 218, 226 are considered will within the scope of the present invention.

Figure 9:
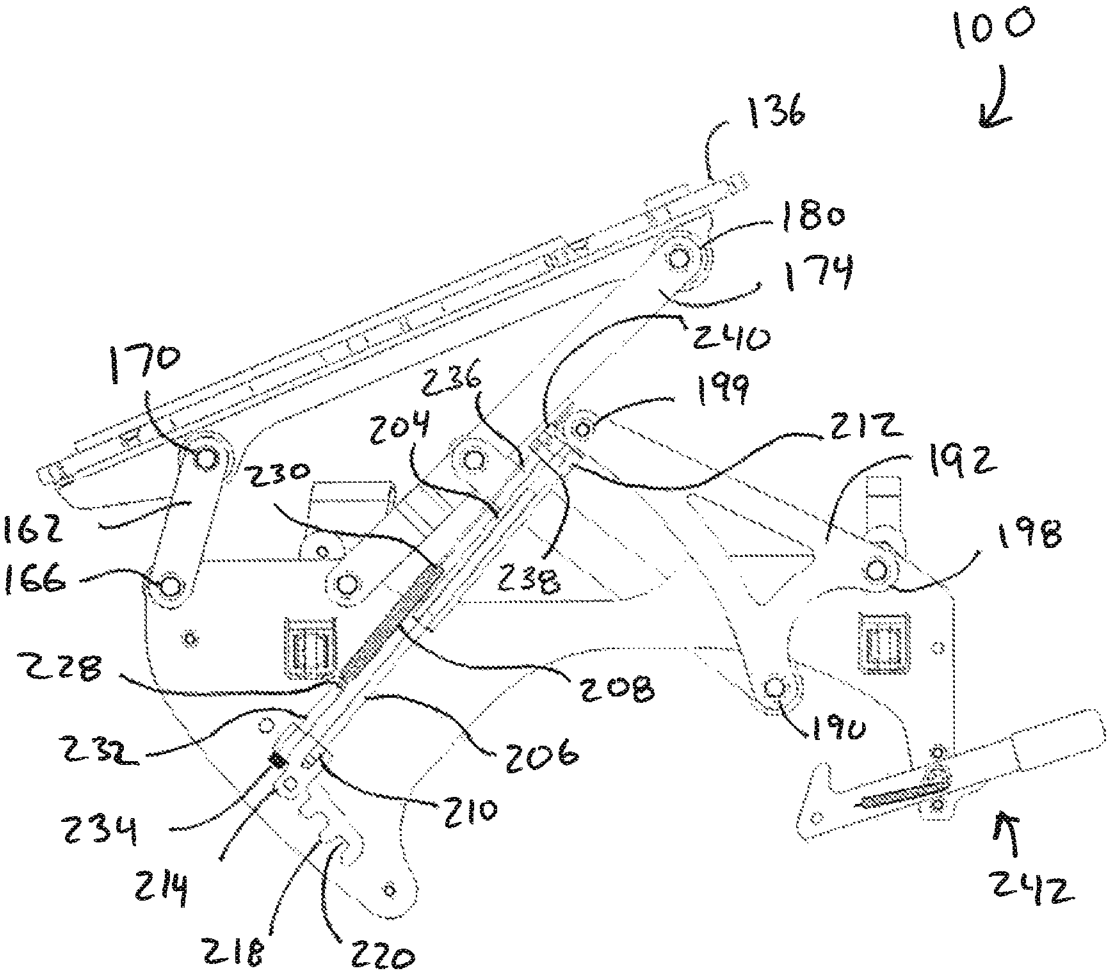
FIG. 9 a is cross-sectional left side view of the lift assist device of FIG. 2 taken across line A-A.

In addition to the gas spring 202, the lift assembly 200 further comprises an antagonistic actuator such as a helical tension spring 208 or counteracting tension spring that is positioned generally parallel to the gas spring 202, and collectively define the actuator assembly. The tension spring 208 provides opposed ends 228 and 230, which are biased apart by the gas spring 202 during seat lifting. The tension spring 208 exerts an attenuating force or opposing "return force" which counters the gas spring lifting force towards the end of seat travel as will be described in further detail below. The tension spring 208 extends between a first end 228 of the that is affixed to a threaded fastener 232 (for example shown best in FIG. 9), and the opposing end 230. The second end may include an elongated length or rod 236 that extends generally rearwardly from the tension spring 208 towards a rear mounting block 238 rotatably affixed to the cam plate 192 at the mounting location 199. More specifically, the rod 236 that extends rearwardly of the tensions spring 208 end 230 slidably passes through an aperture in the rear mounting block 238 and a stop 240 is affixed at the end of the mounting block 238. As shown in FIG. 9, when the seat pan 136 is elevated and the device 10 rises, rod 236 slides through the mounting block 238 until it engages the stop 240, at which point the tension spring 208 is stretched, applying an attenuating force to the force of the gas spring 202, as will be described in further detail below. At the opposing first end 228 of the tensions spring, the affixed threaded fastener extends through the previously described mounting block 214 and terminates at a knob or head 234. Rotation of the knob 234 extends or retracts the threaded fastener 232 through a corresponding threaded aperture in the mounting block 214. When the seat pan 136 is in the lowered position and device 10 is similarly lowered, and the tensions spring 208 is not under force, rotation of the knob 234 alters the point at which the top 240 engages the mounting block 238 and applies the attenuating force. However, when the seat pan 136 is elevated as shown in FIG. 9, rotation of the know 234 will lengthen or shorten the tensions spring 208 that is under force due to active engagement of the stop 240 with the rear mounting block 238, as to adjustably elongate or shorten the tension spring 208 when it is engaged with the gas spring 202. By such an elongating the tension spring 208 additional spring supplied return force may be exerted by the tension spring 208 when countering the lift force of the gas spring 202. In addition, rotation of the knob 234 changes the location at which the gas spring 202 and tension spring 208 are engaged with each other, effectively controlling a bend or "knee" in a nonlinear total spring force, as graphically illustrated in FIGS. 14-16. The opposing end 230 of the tension spring 208 may include an elongated length or rod 236 that extends from the tension spring 208 towards a rear mounting block 238 rotatably affixed to the cam plate 192 at the mounting location 199. The rear mounting block 238 includes an aperture or slot through which the rod 236 freely passes. A stop 240 affixed to a rearward position about the rod 236 is configured to catch and restrict passage of the rod 236 through the aperture in the rear mounting block 238 during gas spring actuated travel of the cam plate 192. That is to say, as the cam plate 192 rotates under the lifting force exerted by the gas spring 202, the rear mounting block 238 will travel uninhibited along the length of the rod 236 extending from the tension spring end 230 until the rear mounting block 238 engages the stop 240. Once the rear mounting block 238 engages the stop 240, the tension spring 208 will begin applying an attenuating or return force that is directionally opposite the lifting force applied by the gas spring 202. In this configuration, the gas spring 202 may apply a lifting force to the device 100 during the initial or first period of seat pan elevation, and the tension spring 208 may only apply a counterbalanced attenuation force at the final or second period of seat pan 136 travel, where the seat pan 136 is approaching full extension. In this manner, the actuator assembly combines to provide a nonlinear lift force comprising a first period having a first rate of amplitude increase when the device 100 is nearer the lowered position and a second period having a second rate of amplitude change that is less than the first rate of amplitude increase when device 100 is nearer the elevated position. That is to say that the magnitude of applied seat force increases at a rate that is higher during the initial lifting phase, i.e., first period, than in the final lifting phase, i.e., second period. In one nonlimiting example, during the second period the rate of change in magnitude of applied seat lift force may be zero. In another nonlimiting example, during the second period the rate of change in magnitude of applied seat lift force may be negative, while the device 100 still applies a sufficient lifting force to elevate the user. By way of adjustment of the knob 234, and the corresponding point at which the stop 240 engages the block 238, the peak magnitude of the attenuating force applied by the tension spring 208 is adjustable.

The relative force applied by both the gas spring 202 and the tension spring 208 may be varied by both step-wise positioning of the mounting block 214 and the position of the threaded fastener 232 relative to mounting block 214. In one embodiment, movement of the end 210 of the cylinder 204 along the plurality of slots 218 allows the force exerted on the second portion 106, e.g., seating pan 130, to vary depending upon the mounting location. That is to say that the lifting force exerted by the gas spring 202, which in one embodiment may be between 20 lbs. and 200 lbs., and preferably 60 pounds, is generally a predetermined lifting force. However, adjustment of the end 210 of the cylinder 204 along the length of the plurality of slots 218 may allow a user to vary the force output to the lift assembly 102 via use of the gas spring 202. So too may the activation point of the tension spring 208 be varied by adjusting the relative position of the threaded fastener 232. For example, in one embodiment of the present invention, the position of the tension spring 208 activation may be adjusted approximately between 0.0 inches and 3.0 inches and more preferably approximately 1.25 inches. In such a preferred embodiment an adjustment of 1.25 inches in the activation length of the tension spring 202 may translate to a distance of approximately 2.0 inches to 3.0 inches of seat pan 136 travel range during which the return force exerted by the tension spring 208 may be set to activate.

In addition to the above referenced lift assembly 102, the wheelchair 10 with the mechanical lift linkage 102 according to the present embodiment, also includes a seat latch assembly 242. Referring initially to FIG. 2, the latch assembly comprises lever arm 244 having a handle portion 246 disposed at a rearward end 248, an upward oriented hook 250 disposed at an opposing forward end 252. The lever arm 242 rotates about a pivot point 254 positioned between the opposing ends 248 and 252, where the lever arm is rotatably affixed to a rear bottom portion of the two plates 128, 130 of the stationary first portion 120 of the lift assembly 102. A spring 256 which extends from the plate 128 to the forward end 252 of the arm maintains the lever arm 244 in either of two positions: an inactive position in which the handle portion 246 is raised up relative to the hook 250; and, an active position in which the handle portion 246 is lowered relative to the hook 250. As shown in FIG. 2, the seat latch assembly 242 is illustrated in the inactive position while the seating pan 136 has been elevated. Maintaining the seat latch assembly 242 in this inactive position allows the seating 136 to freely rise and fall during user egress and ingress respectively. In the event that a user wishes to engage the seat latch assembly 242 and securely retain the seating pan 136 in the lowered position, i.e., deactivate the mechanical lift assembly 102, the user would lower the handle portion 242 while the seating pan 136 was in the lowered position. Doing so will pivot the hook 250 into engagement with a spacer 258 located at the first end 188 of the drive arm 186, which is mounted to the cam plate 192 at the mounting location 190. As such the cam plate 192 will be prevented from rotating under an applied lifting force from the gas spring 202 while the seat latch assembly 242 is actively engaged.

Example 1

In a first non-limiting example, a measurement of the force necessary to overcome the lift mechanism 102, i.e., the force applied by the seat surface 124, during upward travel of the seating pan 136 was calculated only in the presence of a gas spring 202, without the application of the counteracting tension spring 208. In this representative example, the lift force of the gas spring 202 was specified as 100 lb, and the force exerted by the seat surface 124 was calculated at a distance of 8 inches from the rear axle. As indicated above, during use of device 100, selectively positioning the bolt 216, and thereby the end 210 of gas spring 202 within one of the various mounting slots 218, adjusts the angle of the gas spring 202 exerting a lifting force upon the cam plate 192 and/or length of spring arm 206 travel in order to provide a variable lifting force acting upon the seating pan 136. Accordingly, in Example 1, measurements of the force applied to a user by the seat surface 124, during upward travel of the seating pan 136 were calculated from three different positions to simulate three different positions of the bolt 216 within the various mounting slots 218. A first position indicated as "low" represents the bolt 216 positioned within a mounting slot 218 located towards the bottom of the first portion 120 of the list assembly 102. More specifically, in the "low" position, when the seat surface 124 has an inclined angle of 0.0° the gas spring is inclined at an angle of approximately 22.26° relatively to the flat seat surface 124. A second position indicated as "high" represents the bolt 216 positioned within a mounting slot 218 located relatively higher, or nearer to the top of the first portion 120 of the list assembly 102, as compared to the "low" position. More specifically, in the "high" position, when the seat surface 124 has an inclined angle of 0.0° the gas spring is inclined at an angle of approximately 46.26° relatively to the flat seat surface 124. A third position indicated as "middle" represents the bolt 216 positioned within a mounting slot 218 located relatively between the "high" and "low" positions. More specifically, in the "middle" or "medium" position, when the seat surface 124 has an inclined angle of 0.0° the gas spring is inclined at an angle of approximately 34.26° relatively to the flat seat surface 124. The force supplied by the seating surface 124, during travel is represented below in Table 1, relative to the travel of the front arm 162 from its inactive orientation of 16.97° relative to the horizontal, to a fully extended orientation of 77.55°. The corresponding forces are also graphically represented in the chart 300 of FIG. 10, in which it can be seen that the "high" position data set 302 produced more force applied to the seat surface 124, relative to either the "medium" position data set 304 or the relatively "low" position data set 306 that produced the least force applied to the seat surface 124.

TABLE 1

| | High Position | | Middle Position | | Low Position | |
|---|---|---|---|---|---|---|
| Angle of Front Arm 162 | Angle of Gas Spring 202 | Force Applied by Seat Surface 124 (lbs) | Angle of Gas Spring 202 | Force Applied by Seat Surface 124 (lbs) | Angle of Gas Spring 202 | Force Applied by Seat Surface 124 (lbs) |
| 16.97° | 22.26° | 25.85 | 34.26° | 53.60 | 46.26° | 79.00 |
| 19.49° | 23.86° | 36.77 | 35.60° | 65.28 | 47.34° | 90.90 |
| 22.02° | 25.43° | 48.43 | 36.89° | 77.03 | 48.37° | 102.41 |
| 24.54° | 26.97° | 60.68 | 38.14° | 88.83 | 49.36° | 113.62 |
| 27.07° | 28.47° | 73.39 | 39.36° | 100.63 | 50.31° | 124.54 |
| 29.59° | 29.95° | 86.42 | 40.53° | 112.39 | 51.22° | 135.17 |
| 32.12° | 31.39° | 99.61 | 41.66° | 124.03 | 52.09° | 145.50 |
| 34.64° | 32.78° | 112.82 | 42.75° | 135.48 | 52.91° | 155.51 |
| 37.16° | 34.13° | 125.93 | 43.80° | 146.67 | 53.70° | 165.18 |
| 39.69° | 35.42° | 138.80 | 44.79° | 157.55 | 54.45° | 174.47 |
| 42.21° | 36.65° | 151.33 | 45.74° | 168.05 | 55.15° | 183.38 |
| 44.74° | 37.82° | 163.43 | 46.63° | 178.14 | 55.81° | 191.87 |
| 47.26° | 38.92° | 175.02 | 47.47° | 187.78 | 56.43° | 199.95 |
| 49.78° | 39.95° | 186.06 | 48.25° | 196.94 | 57.00° | 207.59 |
| 52.31° | 40.90° | 196.51 | 48.98° | 205.60 | 57.53° | 214.80 |
| 54.83° | 41.79° | 206.34 | 49.66° | 213.76 | 58.02° | 221.57 |
| 57.36° | 42.61° | 215.56 | 50.28° | 221.42 | 58.47° | 227.91 |
| 59.88° | 43.35° | 224.17 | 50.85° | 228.58 | 58.87° | 233.83 |
| 62.41° | 44.03° | 232.20 | 51.37° | 235.25 | 59.24° | 239.35 |
| 64.93° | 44.64° | 239.67 | 51.84° | 241.46 | 59.57° | 244.47 |
| 67.45° | 45.19° | 246.61 | 52.25° | 247.23 | 59.86° | 249.21 |
| 69.98° | 45.67° | 253.08 | 52.63° | 252.59 | 60.11° | 253.61 |
| 72.50° | 46.10° | 259.11 | 52.95° | 257.57 | 60.33° | 257.67 |
| 75.03° | 46.47° | 264.76 | 53.24° | 262.19 | 60.52° | 261.42 |
| 77.55° | 46.79° | 270.09 | 53.48° | 266.50 | 60.67° | 264.88 |

Example 2

In a second non-limiting example, a measurement of the force necessary to overcome the lift mechanism 102, i.e., the force applied by the seat surface 124, during upward travel of the seating pan 136 was again calculated. However, example 2 differs in that, in addition to the presence of a gas spring 202, a counteracting tension spring 208 that exerts an opposing attenuation force without a delay has been included. In Example 2 the parameters of the experiment were consistent with those of Example 1, i.e., the lift force of the gas spring 202 was specified as 100 lb, and the force exerted by the seat surface 124 was calculated at a distance of 8 inches from the rear axle. The variable “low”, “medium”, and “high” positions were also consistently maintained. In this representative Example 2, the counteraction tension spring 208 provides a spring rate of 8.00 lb/in. The force supplied by the seating surface 124, during travel is represented below in Table 2, relative to the travel of the front arm 162 from its inactive orientation of 16.97° relative to the horizontal, to a fully extended orientation of 77.55°. The corresponding forces are also graphically represented in the chart 308 of FIG. 11, with the high position data set 310, medium position data set 312 and low position data set 314 shown.

TABLE 2

| | High Position | | | Middle Position | | | Low Position | | |
|---|---|---|---|---|---|---|---|---|---|
| Angle of Front Arm 162 | Angle of Gas Spring 202 | Spring 208 Force (lbs) | Force Applied by Seat Surface 124 (lbs) | Angle of Gas Spring 202 | Spring 208 Force (lbs) | Force Applied by Seat Surface 124 (lbs) | Angle of Gas Spring 202 | Spring 208 Force (lbs) | Force Applied by Seat Surface 124 (lbs) |
| 16.97° | 22.26° | 0.00 | 25.85 | 34.26° | 0.00 | 53.60 | 46.26° | 0.00 | 79.00 |
| 19.49° | 23.86° | 0.34 | 36.65 | 35.60° | 0.58 | 64.90 | 47.34° | 0.76 | 90.21 |
| 22.02° | 25.43° | 0.75 | 48.06 | 36.89° | 1.21 | 76.10 | 48.37° | 1.55 | 100.83 |
| 24.54° | 26.97° | 1.25 | 59.92 | 38.14° | 1.90 | 87.14 | 49.36° | 2.38 | 110.91 |
| 27.07° | 28.47° | 1.83 | 72.05 | 39.36° | 2.66 | 97.96 | 50.31° | 3.26 | 120.48 |
| 29.59° | 29.95° | 2.50 | 84.25 | 40.53° | 3.47 | 108.49 | 51.22° | 4.18 | 129.52 |
| 32.12° | 31.39° | 3.26 | 96.36 | 41.66° | 4.35 | 118.63 | 52.09° | 5.14 | 138.02 |
| 34.64° | 32.78° | 4.10 | 108.20 | 42.75° | 5.29 | 128.31 | 52.91° | 6.15 | 145.95 |
| 37.16° | 34.13° | 5.02 | 119.60 | 43.80° | 6.28 | 137.45 | 53.70° | 7.20 | 153.29 |
| 39.69° | 35.42° | 6.03 | 130.43 | 44.79° | 7.34 | 145.99 | 54.45° | 8.29 | 160.01 |
| 42.21° | 36.65° | 7.11 | 140.56 | 45.74° | 8.45 | 153.86 | 55.15° | 9.42 | 166.11 |
| 44.74° | 37.82° | 8.27 | 149.91 | 46.63° | 9.61 | 161.02 | 55.81° | 10.58 | 171.57 |
| 47.26° | 38.92° | 9.50 | 158.39 | 47.47° | 10.82 | 167.46 | 56.43° | 11.78 | 176.38 |
| 49.78° | 39.95° | 10.80 | 165.97 | 48.25° | 12.08 | 173.15 | 57.00° | 13.02 | 180.57 |
| 52.31° | 40.90° | 12.15 | 172.63 | 48.98° | 13.38 | 178.09 | 57.53° | 14.28 | 184.12 |
| 54.83° | 41.79° | 13.56 | 178.35 | 49.66° | 14.72 | 182.29 | 58.02° | 15.57 | 187.07 |
| 57.36° | 42.61° | 15.03 | 183.17 | 50.28° | 16.10 | 185.78 | 58.47° | 16.88 | 189.43 |

TABLE 2-continued

| | High Position | | | Middle Position | | | Low Position | | |
|---|---|---|---|---|---|---|---|---|---|
| Angle of Front Arm 162 | Angle of Gas Spring 202 | Spring 208 Force (lbs) | Force Applied by Seat Surface 124 (lbs) | Angle of Gas Spring 202 | Spring 208 Force (lbs) | Force Applied by Seat Surface 124 (lbs) | Angle of Gas Spring 202 | Spring 208 Force (lbs) | Force Applied by Seat Surface 124 (lbs) |
| 59.88° | 43.35° | 16.53 | 187.11 | 50.85° | 17.51 | 188.56 | 58.87° | 18.22 | 191.23 |
| 62.41° | 44.03° | 18.08 | 190.22 | 51.37° | 18.94 | 190.69 | 59.24° | 19.58 | 192.49 |
| 64.93° | 44.64° | 19.66 | 192.54 | 51.84° | 20.40 | 192.19 | 59.57° | 20.95 | 193.25 |
| 67.45° | 45.19° | 21.28 | 194.14 | 52.25° | 21.89 | 193.12 | 59.86° | 22.34 | 193.54 |
| 69.98° | 45.67° | 22.92 | 195.07 | 52.63° | 23.39 | 193.50 | 60.11° | 23.74 | 193.39 |
| 72.50° | 46.10° | 24.59 | 195.40 | 52.95° | 24.91 | 193.40 | 60.33° | 25.16 | 192.84 |
| 75.03° | 46.47° | 26.28 | 195.19 | 53.24° | 26.45 | 192.84 | 60.52° | 26.58 | 191.93 |
| 77.55° | 46.79° | 27.98 | 194.50 | 53.48° | 28.00 | 191.89 | 60.67° | 28.01 | 190.69 |

Example 3

In a third non-limiting example, a measurement of the force necessary to overcome the lift mechanism 102, i.e., the force applied by the seat surface 124, during upward travel of the seating pan 136 was again calculated. However, Example 3 differs in that, in addition to the presence of a gas spring 202, and a counteracting tension spring 208 that exerts an opposing return force, activation of the counteracting tension spring 208 was delayed. In Example 3 the parameters of the experiment were consistent with those of Example 1 and Example 2, i.e., the lift force of the gas spring 202 was specified as 100 lb, and the force exerted by the seat surface 124 was calculated at a distance of 8 inches from the rear axle. The variable "low", "medium", and "high" positions were also consistently maintained. In this representative Example 3, the counteraction tension spring 208 also provides a spring rate of 8.00 lb/in. However, activation of the counteracting tension spring 208 is delayed, such that tension spring 208 does not activate until the gas spring 202 has traveled 1.0 inches. The force supplied by the seating surface 124, during travel is represented below in Table 3, relative to the travel of the front arm 162 from its inactive orientation of 16.97° relative to the horizontal, to a fully extended orientation of 77.55°. The corresponding forcer are also graphically represented in the chart 316 of FIG. 12, with the high position data set 318, medium position data set 320, and low position data set 322 shown.

TABLE 3

| | High Position | | | Middle Position | | | Low Position | | |
|---|---|---|---|---|---|---|---|---|---|
| Angle of Front Arm 162 | Angle of Gas Spring 202 | Spring 208 Force (lbs) | Force Applied by Seat Surface 124 (lbs) | Angle of Gas Spring 202 | Spring 208 Force (lbs) | Force Applied by Seat Surface 124 (lbs) | Angle of Gas Spring 202 | Spring 208 Force (lbs) | Force Applied by Seat Surface 124 (lbs) |
| 16.97° | 22.26° | 0.00 | 25.85 | 34.26° | 0.00 | 53.60 | 46.26° | 0.00 | 79.00 |
| 19.49° | 23.86° | 0.00 | 36.77 | 35.60° | 0.00 | 65.28 | 47.34° | 0.00 | 90.90 |
| 22.02° | 25.43° | 0.00 | 48.43 | 36.89° | 0.00 | 77.03 | 48.37° | 0.00 | 102.41 |
| 24.54° | 26.97° | 0.00 | 60.68 | 38.14° | 0.00 | 88.83 | 49.36° | 0.00 | 113.62 |
| 27.07° | 28.47° | 0.00 | 73.39 | 39.36° | 0.00 | 100.63 | 50.31° | 0.00 | 124.54 |
| 29.59° | 29.95° | 0.00 | 86.42 | 40.53° | 0.00 | 112.39 | 51.22° | 0.00 | 135.17 |
| 32.12° | 31.39° | 0.00 | 99.61 | 41.66° | 0.00 | 124.03 | 52.09° | 0.00 | 145.50 |
| 34.64° | 32.78° | 0.00 | 112.82 | 42.75° | 0.00 | 135.48 | 52.91° | 0.00 | 155.51 |
| 37.16° | 34.13° | 0.00 | 125.93 | 43.80° | 0.00 | 146.67 | 53.70° | 0.00 | 165.18 |
| 39.69° | 35.42° | 0.00 | 138.80 | 44.79° | 0.00 | 157.55 | 54.45° | 0.29 | 173.97 |
| 42.21° | 36.65° | 0.00 | 151.33 | 45.74° | 0.45 | 167.30 | 55.15° | 1.42 | 180.78 |
| 44.74° | 37.82° | 0.27 | 162.98 | 46.63° | 1.61 | 175.28 | 55.81° | 2.58 | 186.92 |
| 47.26° | 38.92° | 1.50 | 172.39 | 47.47° | 2.82 | 182.48 | 56.43° | 3.78 | 192.38 |
| 49.78° | 39.95° | 2.80 | 180.86 | 48.25° | 4.08 | 188.91 | 57.00° | 5.02 | 197.17 |
| 52.31° | 40.90° | 4.15 | 188.35 | 48.98° | 5.38 | 194.54 | 57.53° | 6.28 | 201.31 |
| 54.83° | 41.79° | 5.56 | 194.86 | 49.66° | 6.72 | 199.40 | 58.02° | 7.57 | 204.80 |
| 57.36° | 42.61° | 7.03 | 200.42 | 50.28° | 8.10 | 203.49 | 58.47° | 8.88 | 207.66 |
| 59.88° | 43.35° | 8.53 | 205.05 | 50.85° | 9.51 | 206.85 | 58.87° | 10.22 | 209.93 |
| 62.41° | 44.03° | 10.08 | 208.79 | 51.37° | 10.94 | 209.51 | 59.24° | 11.58 | 211.64 |
| 64.93° | 44.64° | 11.66 | 211.71 | 51.84° | 12.40 | 211.51 | 59.57° | 12.95 | 212.80 |
| 67.45° | 45.19° | 13.28 | 213.86 | 52.25° | 13.89 | 212.90 | 59.86° | 14.34 | 213.47 |
| 69.98° | 45.67° | 14.92 | 215.31 | 52.63° | 15.39 | 213.71 | 60.11° | 15.74 | 213.68 |
| 72.50° | 46.10° | 16.59 | 216.13 | 52.95° | 16.91 | 214.00 | 60.33° | 17.16 | 213.46 |
| 75.03° | 46.47° | 18.28 | 216.37 | 53.24° | 18.45 | 213.82 | 60.52° | 18.58 | 212.85 |
| 77.55° | 46.79° | 19.98 | 216.11 | 53.48° | 20.00 | 213.21 | 60.67° | 20.01 | 211.88 |

Figure 11:
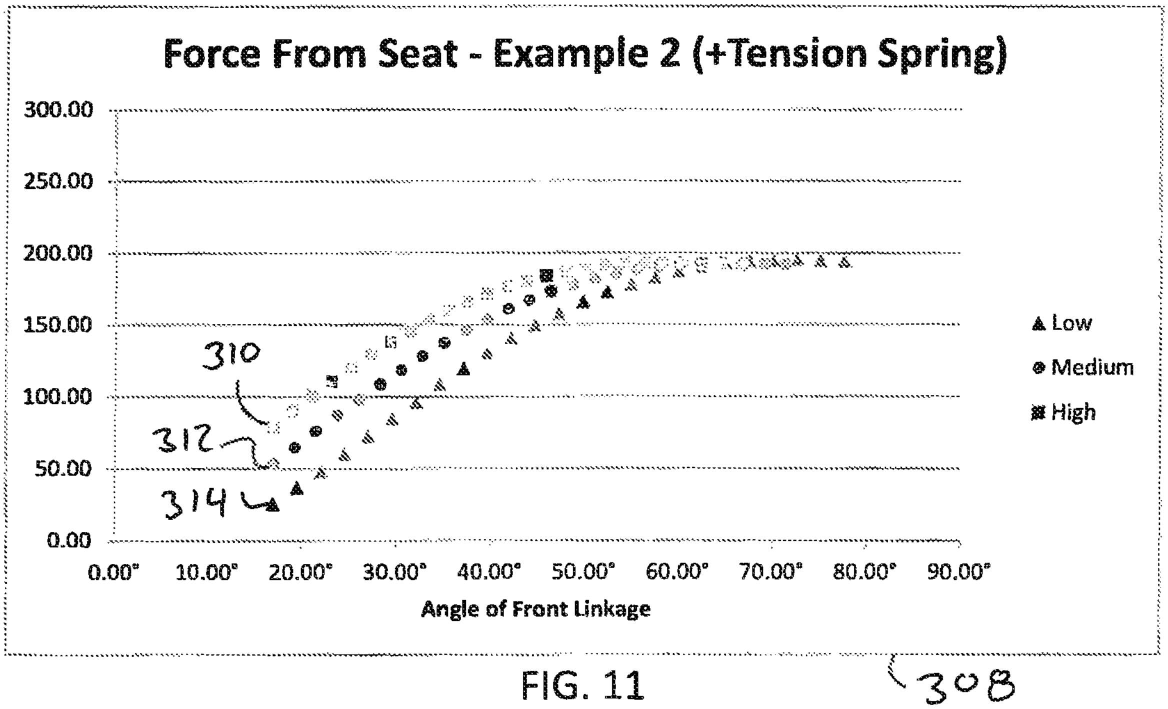
FIG. 11 is a chart illustrating the force in pounds from the seating surface of the lift assist device over the course of seating pan travel, as applied by a gas spring and a counteracting tension spring, when an end of the gas spring is positioned in three different locations.
Figure 12:
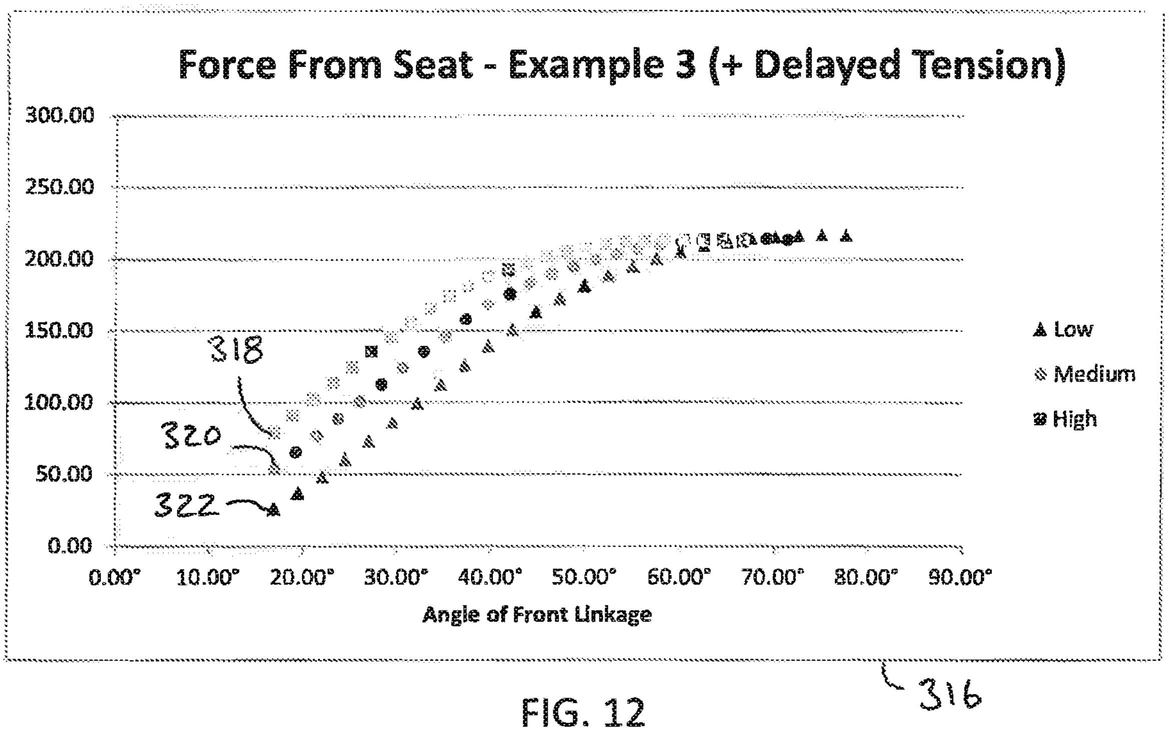
FIG. 12 is a chart illustrating the force in pounds from the seating surface of the lift assist device over the course of seating pan travel, as applied by a gas spring and a delayed counteracting tension spring, when an end of the gas spring is positioned in three different locations.
Figure 13:
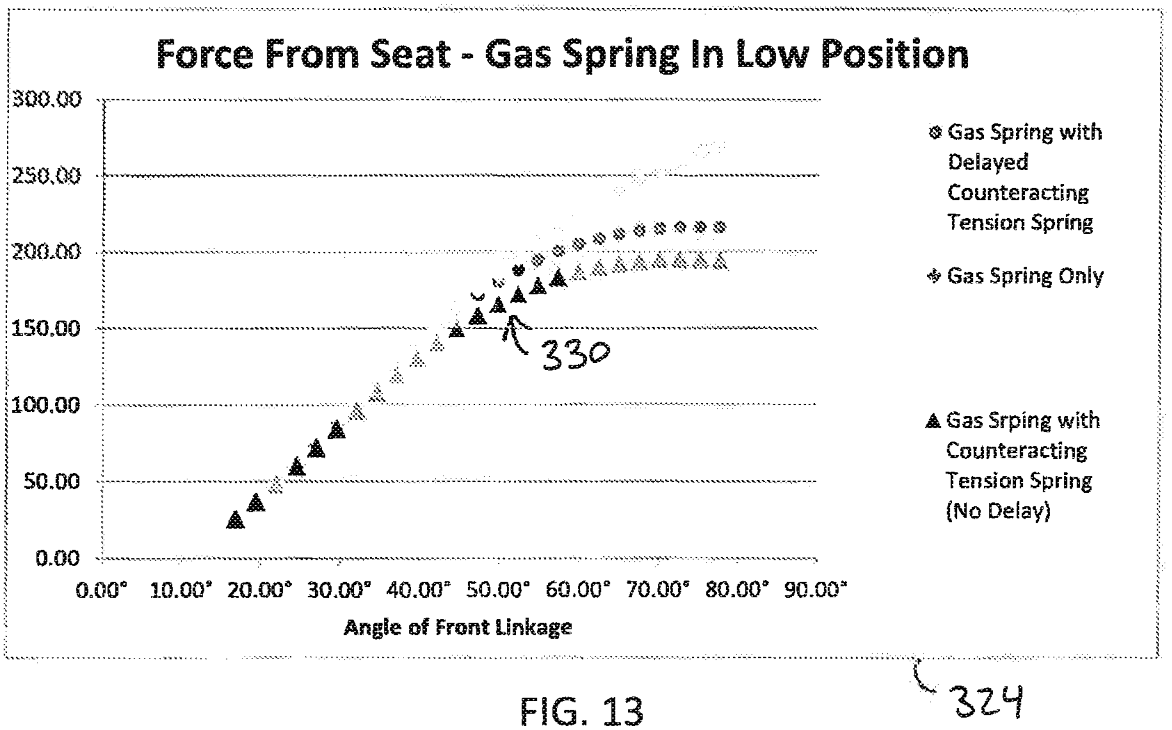
FIG. 13 is a chart comparing the force in pounds from the seating surface of the lift assist device over the course of seating pan travel, as applied by a gas spring, a gas spring and counteracting tension spring, and a gas spring and delayed counteracting tension spring, when an end of the gas spring is positioned in a relatively low position.

As can be seen in Tables 1-3 and corresponding charts 300, 308, 316 of FIGS. 11-13, the addition of the counteracting tension spring 208 substantially limits the overall force exerted by the seat surface 124, and particularly as the front arm 162 extend past an angle of approximately 45°, which corresponds to the seating pan 136 having travelled to an incline of approximately 12.5° of its total 23.5° incline at full extension. Furthermore, when not delayed, as shown in Example 2, the counteracting tension spring 208 exhibits some reduction in the initial output of the force exhibited by the lift mechanism 102, the proportional impact of which is magnified as the seating pan 136 extends through its range of travel. It is also noted that the impact of the force applied by the counteracting tension spring 208 appears to be proportionately more noticeable at an initial phase of seating pan 136 travel, when the end 210 of the gas spring 202 is in the lower position, corresponding to a lower force setting of the lift mechanism 102.

Figure 14:
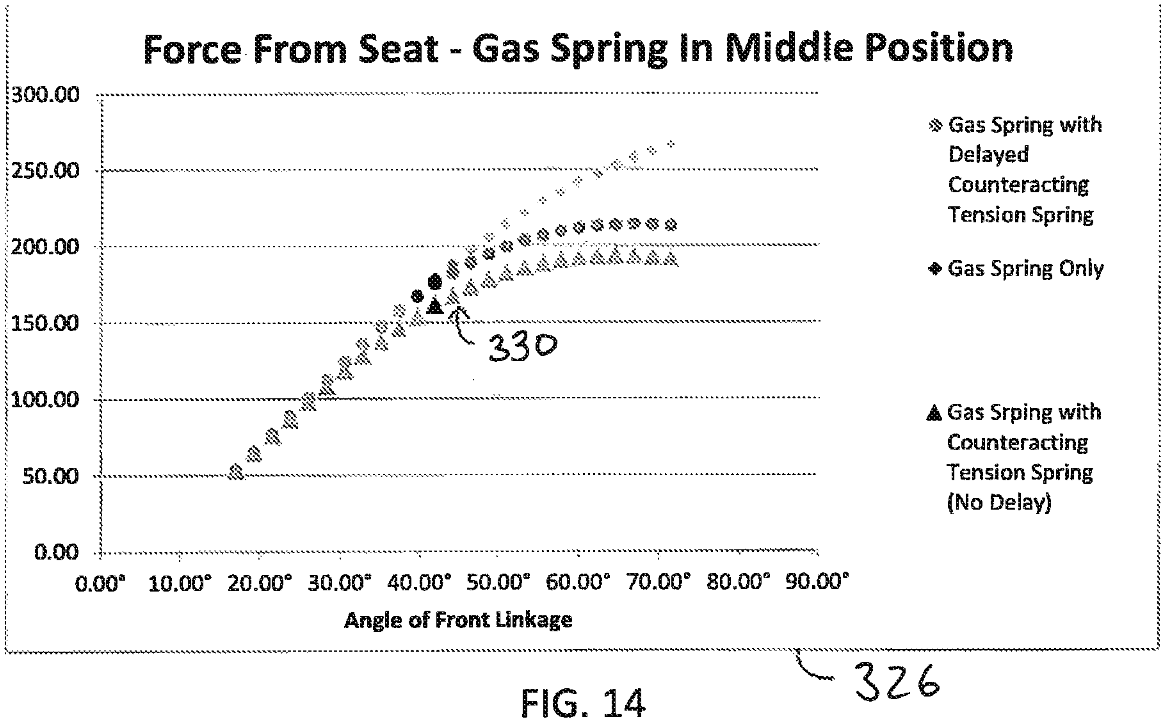
FIG. 14 is a chart comparing the force in pounds from the seating surface of the lift assist device over the course of seating pan travel, as applied by a gas spring, a gas spring and counteracting tension spring, and a gas spring and delayed counteracting tension spring, when an end of the gas spring is positioned in a relatively middle position and, FIG. 15 is a chart comparing the force in pounds from the seating surface of the lift assist device over the course of sealing pan travel, as applied by a gas spring, a gas spring and counteracting tension spring, and a gas spring and delayed counteracting tension spring, when an end of the gas spring is positioned in a relatively high position.
Figure 15:
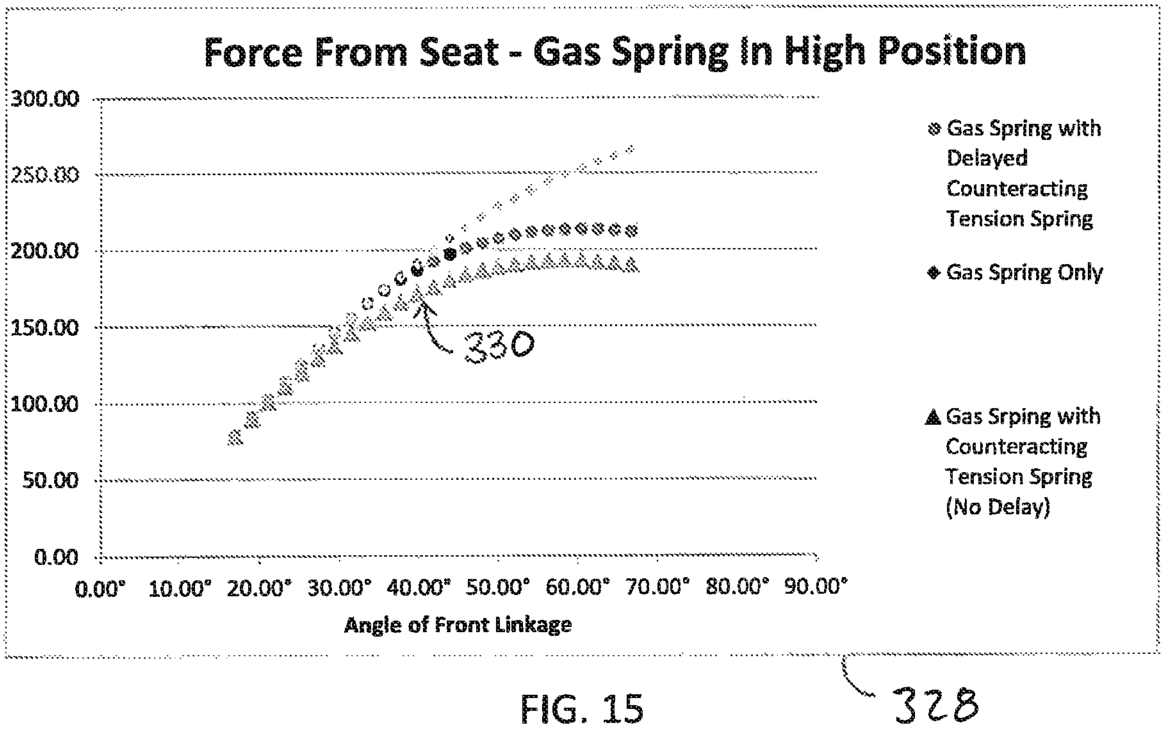

Furthermore, the impact of a delayed and non-delayed counteracting tension spring 208 can be more clearly seen at each of the three relative positions of the end 210 of the gas spring 202 in the charts 324, 326, 328 of FIGS. 13-15. In these charts 324, 326, 328, which graphically depict various mounting positions of the end 210 of the gas spring 208 respectively, it is clearly seen that application of a delayed counteracting tension spring 208 does not adversely inhibit the application of seat lifting force during the initial phase of seat pan 136 travel. That is to say that the total output force from the seat, during the course of seat pan 136 travel, includes a first and second spring period separated by when the angle of the front linkage 162 has traveled about 40° to 50° and more preferably about 45°. During upward travel of the seat, the first spring period, i.e., when the angle of the front linkage 162 is less than about 40° to 50°, the force provided by the seat is attributable to the gas spring 202. Then during the second spring period, i.e., when the angle of the front linkage 162 is at or greater than about 40° to 50°, the force provided by the seat is attributable to the gas spring 202 counteracted by the extension spring 208. The location at which the outward force transitions from the first spring period to the second spring period, resulting in the bend or "knee" 330 shown in FIGS. 13-15 is determined by a combination of the position of the bolt 216, which denotes the end 210 of the gas spring 202 and the knob 234, which changes the location at which the gas spring 202 and tension spring 208 are engaged with each other at the sliding block 238. For example, the knee 330 or location at which the nonlinear lifting force transitions from the first period to the second period is approximately 50° when the end 210 of the gas spring 208 is located in the "low" mounting position; whereas, the knee 330 occurs at a relatively lower angle when the end 210 of the gas spring 208 is positioned to a relatively higher mounting position. Accordingly, later implementation of the delayed counteracting tension spring 208 does gradually inhibit or attenuate the seat lifting force during the final period of seat pan 136 travel. In accordance with one embodiment of the present invention, this desirable nonlinear force applied by the seat surface 124 is beneficial in gradually arresting the upward movement of the seating surface 124 as to prevent the user from being jostled or jettisoned from the seating surface 124 of the wheelchair 10.

Furthermore, it should be well understood that while the Examples 1-3 discussed above provide a single representative sample of a gas spring force, counteracting tension spring force, and measurement location along the seating surface, the generally findings of these examples are common among variable testing parameters. Furthermore, the adjustability of the gas spring force, and counteracting tension spring force as described above further support the inclusion various metrics within the scope of the present invention.

Still further, while the present invention has been described in accordance with the preceding embodiment in the context of a lift assembly 100 configured for use and installation within a wheelchair 10, the present invention is not so limited. That is to say, such a lift assembly 100 in accordance with the present invention may be applied in no wheelchair and/or nor seating application in which a non-linear lifting force is desirable.

Many other changes and modifications could be made to the invention without departing from the spirit thereof. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention.

We claim:

1. A wheelchair including a wheelchair lift assembly configured to assist an individual sitting into and/or rising from a wheelchair, comprising:

a frame providing a seat surface configured for supporting a seated individual;

a first and second wheel attached to the frame at left and right transversely opposed sides of the seat surface supporting the frame and positioned for rotation by the seated individual;

a lift assembly positioned between the seat surface and the frame to urge the seat surface upward with respect to the frame from a lowered position when supporting the seated individual during use to an elevated position with respect to the frame assisting the individual during ingress or egress to or from the wheelchair, the lift assembly comprising a first portion mounted to the frame, a second portion mounted to the seating surface; a mechanical linkage extending from the first portion to the second portion, and an actuator assembly extending from the first portion to the mechanical linkage;

the actuator assembly producing a nonlinear lift force comprising a first period having a first rate of amplitude increase when the second portion of the lift assembly is nearer the lowered position and a second period having a second rate of amplitude change that is less than the first rate of amplitude increase when the second portion of the lift assembly is nearer the elevated position, wherein the actuator assembly comprises a seat lift actuator providing a lifting force and an antagonistic actuator providing an opposing attenuation force.

2. The wheelchair of claim 1, wherein the seat lift actuator extends from a first end configured to engage the first portion of the lift assembly and an opposing second end affixed to the mechanical linkage.

3. The wheelchair of claim 2, wherein an angle of the seat lift actuator relative to the first portion of the lift mechanism is variable.

4. The wheelchair of claim 3, wherein a mounting position of the first end of the seat lift actuator is selected from one of a plurality of mounting positions disposed about the first portion of the lift assembly.

5. The wheelchair of claim 1, wherein the lifting force provided by the seat lift actuator is between 20.0 and 200.0 pounds.

6. The wheelchair of claim 1, wherein the seat lift actuator is a gas spring.

7. The wheelchair of claim 1, wherein the antagonistic actuator extends from a first end configured to engage the first portion of the lift assembly and an opposing second end configured to releasably engage the mechanical linkage when the second portion of the lift assembly is nearer the elevated position.

8. The wheelchair of claim 7, wherein an angle of the antagonistic actuator relative to the first portion of the lift mechanism is variable.

9. The wheelchair of claim 8, wherein a mounting position of the first end of the antagonistic actuator is selected from one of a plurality of mounting positions disposed about the first portion of the lift assembly.

10. The wheelchair of claim 7, wherein the first end of the antagonistic actuator is affixed to a threaded fastener configured to modify a length of the antagonistic actuator extending between the first end configured to engage the first portion of the lift assembly and an opposing second end configured to releasably engage the mechanical linkage.

11. The wheelchair of claim 10, wherein the threaded fastener is received in a threaded aperture disposed within a mount that receive the first end of the antagonistic actuator and a first end of the seat first end of the seat lift actuator such that the seat lift actuator and an antagonistic actuator are in a parallel orientation.

12. The wheelchair of claim 10, wherein rotation of the threaded fastener modifies a peak magnitude of the opposing attenuation force supplied by the antagonistic actuator.

13. The wheelchair of claim 11, wherein rotation of the threaded fastener modifies a position along extension of the mechanical linkage in which the antagonistic actuator applies the opposing attenuation force and the nonlinear lift force transitions from the first period to the second period.

14. The wheelchair of claim 1, wherein the antagonistic actuator is a helical tension spring.

15. A wheelchair seat lift kit configured to assist an individual sitting into and/or rising from a wheelchair, comprising:

a seat surface configured for supporting a seated individual;

a lift assembly configured to be positioned between the seat surface and a frame of the wheelchair to urge the seat surface upward from a lowered position when supporting the seated individual during use to an elevated position with respect to the frame assisting the individual during ingress or egress to or from the wheelchair, the lift assembly comprising a first portion configured to be mounted to the frame, a second portion mounted to the seating surface; a mechanical lift linkage extending from the first portion to the second portion, and an actuator extending from the first portion to the mechanical linkage;

the actuator assembly producing a nonlinear lift force exhibiting a first period having a first rate of amplitude increase when the second portion of the lift assembly is nearer the lowered position and a second period having a second rate of amplitude change that is less than the first rate of amplitude increase when the second portion of the lift assembly is nearer the elevated position, wherein the actuator assembly comprises a seat lift actuator providing a lifting force and an antagonistic actuator providing an opposing attenuation force.

16. The wheelchair of claim 15, wherein the seat lift actuator extends from a first end configured to engage the first portion of the lift assembly and an opposing second end affixed to the mechanical linkage.

17. The wheelchair of claim 16, wherein an angle of the seat lift actuator relative to the first portion of the lift mechanism is variable.

18. The wheelchair of claim 15, wherein the antagonistic actuator extends from a first end configured to engage the first portion of the lift assembly and an opposing second end configured to releasably engage the mechanical linkage when the second portion of the lift assembly is nearer the elevated position.

19. The wheelchair of claim 18, wherein an angle of the antagonistic actuator relative to the first portion of the lift mechanism is variable.

20. The wheelchair of claim 18, wherein the length of the antagonistic actuator extending between the first end configured to engage the first portion of the lift assembly and an opposing second end configured to releasably engage the mechanical linkage is variable.

21. The wheelchair of claim 20, wherein a peak magnitude of the opposing attenuation force supplied by the antagonistic actuator is variable.

22. The wheelchair of claim 20, wherein a position along extension of the mechanical linkage in which the antagonistic actuator applies the opposing attenuation force and the nonlinear lift force transitions from the first period to the second period is variable.

* * * * *